(12) United States Patent
Tsubouchi et al.

(10) Patent No.: US 6,170,382 B1
(45) Date of Patent: Jan. 9, 2001

(54) NEGATIVE-PRESSURE BOOSTER

(75) Inventors: Kaoru Tsubouchi, Toyota; Akihiko Miwa, Anjo, both of (JP)

(73) Assignee: Aisin Seiki Kabushiki Kaisha, Kariya (JP)

(*) Notice: Under 35 U.S.C. 154(b), the term of this patent shall be extended for 0 days.

(21) Appl. No.: 09/273,533

(22) Filed: Mar. 22, 1999

(30) Foreign Application Priority Data

Mar. 20, 1998 (JP) .................................................. 10-071722
Mar. 20, 1998 (JP) .................................................. 10-071725
Mar. 20, 1998 (JP) .................................................. 10-071726

(51) Int. Cl.$^7$ ...................................................... F15B 9/09
(52) U.S. Cl. ............................................................ 91/367
(58) Field of Search ................................... 91/367, 376 R

(56) References Cited

U.S. PATENT DOCUMENTS 5,690,015 * 11/1997 Michels et al. ..................... 91/376 R
5,937,727 * 8/1999 Klesen et al. ........................ 91/367

FOREIGN PATENT DOCUMENTS 7-251733   10/1995   (JP) .

OTHER PUBLICATIONS

K. Bill et al., "Smart Booster–New Key Element for Brake Systems with Enhanced Function Potential", 1995 SAE International Congress and Exposition, Feb. 27–Mar. 2, 1995, Detroit, Michigan, pp. 27–33.

* cited by examiner

Primary Examiner—F. Daniel Lopez
(74) Attorney, Agent, or Firm—Burns, Doane, Swecker & Mathis, LLP

(57) ABSTRACT

A negative-pressure booster is provided with a housing, two movable walls, a power piston, an input member, an air valve seat, a negative-pressure valve seat, a control valve having an air sealing valve portion and a negative-pressure sealing portion, an output rod, a reaction disc, a slider valve, and an actuator. The output of the negative-pressure booster can be adjusted by adjusting the driving force of the actuator.

19 Claims, 8 Drawing Sheets

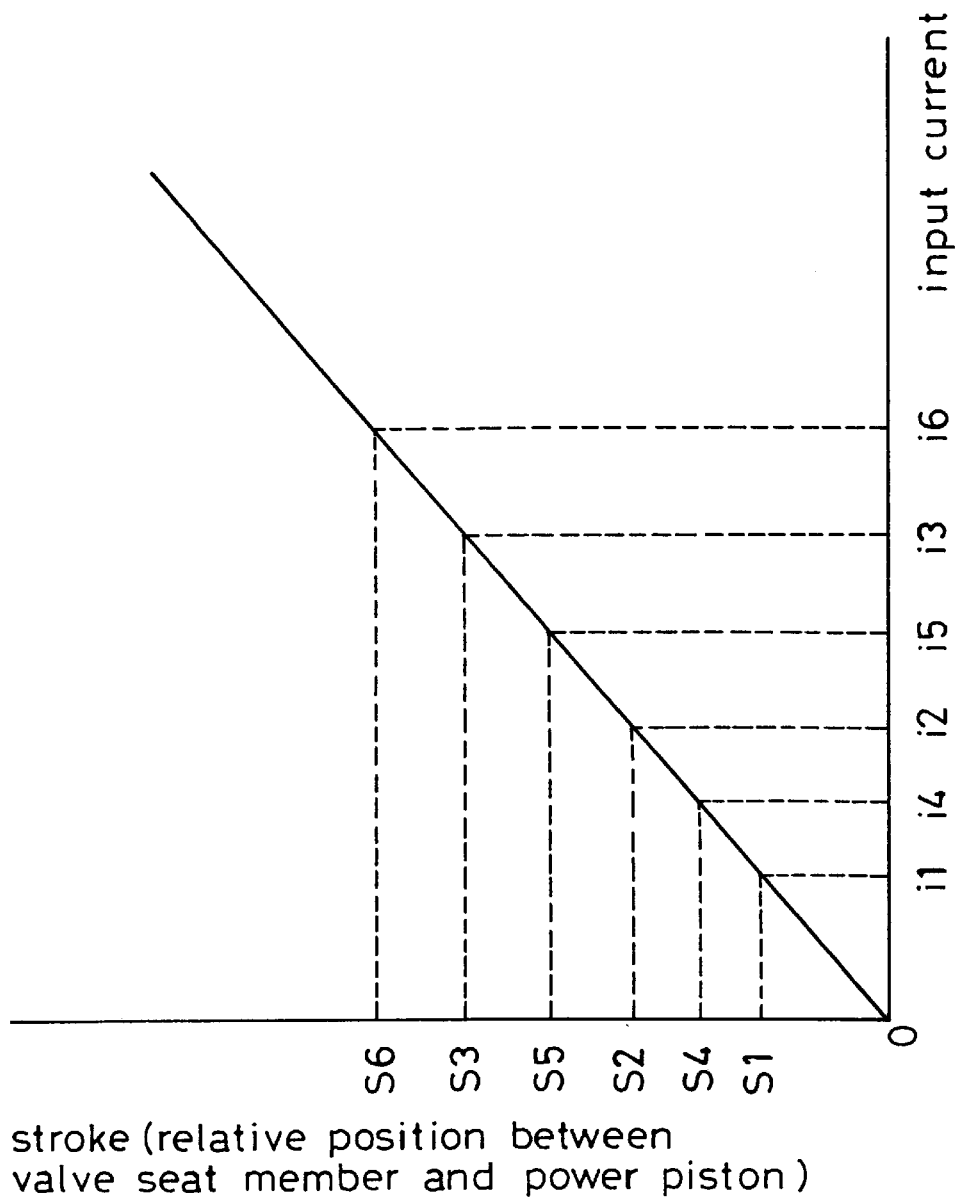

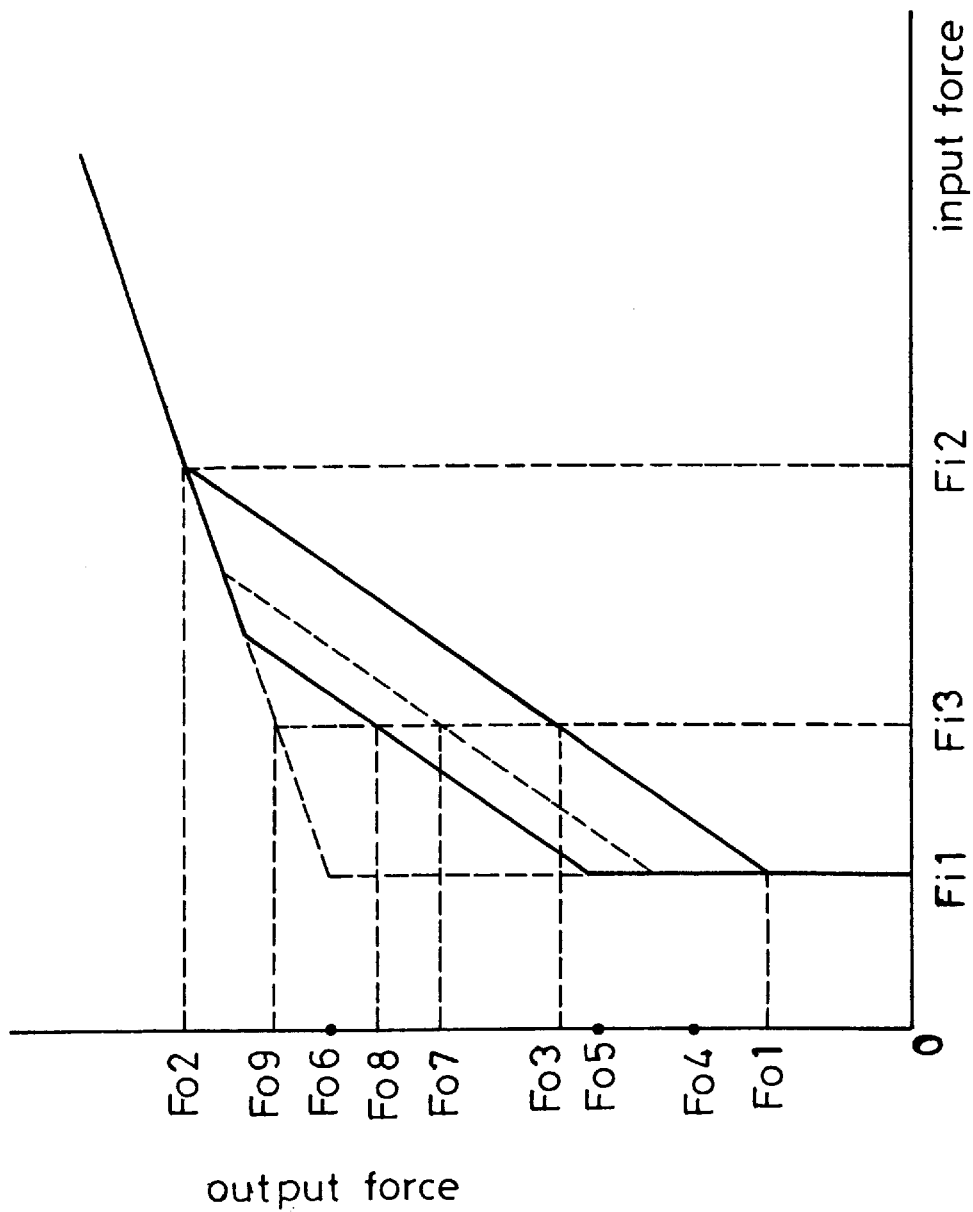

US 6,170,382 B1

NEGATIVE-PRESSURE BOOSTER

This application corresponds to and claims priority under 35 U.S.C. § 119 with respect to Japanese Application No. 10(1998)-71722 filed on Mar. 20, 1998, Japanese Application No. 10(1998)-71725 filed on Mar. 20, 1998 and Japanese Application No. 10(1998)-71726 filed on Mar. 20, 1998, the entire content of each of which is incorporated herein by reference.

FIELD OF THE INVENTION

The present invention generally relates to a vehicle brake apparatus component. More particularly, the present invention pertains to a negative-pressure booster for an automobile.

BACKGROUND OF THE INVENTION

A known type of negative-pressure booster is disclosed in SAE 950760 and includes a housing in which is formed at least one pressure space and a movable wall provided in the housing for advancing and retreating movement with respect to the housing. The movable wall divides the pressure space inside the housing into a front chamber that is adapted to communicate with a negative-pressure source and a rear chamber that is adapted to selectively communicate with the front chamber or atmosphere. A power piston is connected to the movable wall, and an input member is provided inside the power piston for advancing and retreating movement with respect to the power piston. An air valve seat is provided in the power piston for advancing and retreating movement together with the input member. A negative-pressure valve seat is provided in the power piston. A control valve has an air sealing portion capable of contacting and separating from the air valve seat for isolating the rear chamber from the atmosphere by coming into contact with the air valve seat and for causing the rear chamber to communicate with the atmosphere as a result of being separated from the air valve seat. A negative-pressure sealing portion is capable of contacting and separating from the negative-pressure valve seat for isolating the rear chamber from the front chamber by coming into contact with the negative-pressure valve seat and for causing the rear chamber to communicate with the front chamber by being separated from the negative-pressure valve seat. An output member outputs outside the booster an advancing force of the power piston that is generated in association with movement of the movable wall and a reaction member transmits the advancing force of the power piston and an input that is applied to the input member to the output member. The reaction member also applies a reaction force corresponding in magnitude to the output of the output member to the input member to cause the input member to retreat. An actuator causes the rear chamber to communicate with the atmosphere by separating the air sealing portion from the air valve seat. The known negative-pressure booster is further provided with a detecting device for detecting the volume of separation between the air valve seat and the air sealing portion, and the actuator is caused to operate in accordance with the detection result of the detecting device.

However, the presence of the detecting device which detects the volume of separation between the air valve seat and the air sealing portion necessarily increases the cost and complexity of the negative-pressure booster.

In light of the foregoing, a need exists for a negative-pressure booster having a relatively simple construction while at the same time being relatively low in cost.

SUMMARY OF THE INVENTION

In light of the foregoing, the present invention provides a negative-pressure booster that includes a housing in which is formed at least one pressure space, a movable wall provided in the housing so as to be able to advance and retreat with respect to the housing, and dividing the pressure space into a front chamber adapted to communicate with a negative-pressure source and a rear chamber adapted to be selectively communicated with the front chamber or the atmosphere, a power piston connected to the movable wall, an input member provided inside the power piston for advancing and retreating with respect to the power piston, and a valve mechanism for allowing the rear chamber to communicate with the front chamber or the atmosphere in accordance with the movement of the input member. An output member outputs outside the booster an advancing force of the power piston that is generated in association with movement of the movable wall, and a reaction force member transmits the advancing force of the power piston and the input applied to the input member to the output member while also applying a reaction force corresponding in magnitude to the output of the output member to the input member to cause the input member to retreat. An actuator allows the rear chamber to communicate with the atmosphere by causing the valve mechanism to operate, and an engagement member is capable of engaging the input member for allowing retreating movement of the input member by being deformed elastically when the input member receives the reaction force from the reaction force member in association with operation of the actuator. The retreat of the input member receiving the reaction force from the reaction force member in association with the operation of the actuator causes the valve mechanism to operate to thereby allow the rear chamber to be isolated from the atmosphere. The adjustment of the driving force of the actuator makes the output of the output member adjustable.

In the negative-pressure booster of the present invention, because the adjustment of the driving force of the actuator makes the output of the output member adjustable, the output can be produced so as to be more suitable for each situation. Therefore, unlike other known negative-pressure boosters, no detecting means for detecting the volume of the separation between the air valve seat and the air sealing portion is needed. This enables a relatively simple and cost effective construction of the booster. That is, a negative-pressure booster can be produced that is simpler in construction and lower is cost.

It is preferable that the valve mechanism include an air valve seat that can advance and retreat together with the input member, a negative-pressure valve seat provided in the power piston, an air sealing portion that is able to contact and be separated from the air valve seat for isolating the rear chamber from the atmosphere when it comes into contact with the air valve seat and causes the rear chamber to communicate with the air when it is separated from the air valve seat, and a negative-pressure sealing portion that can contact and be separated from the negative-pressure valve seat for isolating the rear chamber from the front chamber when it comes into contact with the negative-pressure valve seat and for causing the rear chamber to communicate with the front chamber when it is separated from the negative-pressure valve seat. The actuator allows the rear chamber to communicate with the atmosphere by separating the air sealing portion from the air valve seat, and the retreat of the input member receiving the reaction force from the reaction force member in association with the operation of the actuator causes the air sealing portion to come into contact with the air valve seat to thereby allow the rear chamber to be isolated from the atmosphere. Because the actuator allows the rear chamber to communicate with the atmosphere by separating the air sealing portion from the air valve seat, an improved valve mechanism is achieved.

The air valve seat is preferably provided in the input member and advances and retreats together with the input member. Also, the booster further includes a control valve having the air sealing portion and the negative-pressure sealing portion formed in an integral manner, and a valve seat member that is provided so as to be able to advance and retreat with respect to the power piston, while also advancing and retreating independently of the movement of the input member, and isolating the rear chamber from the front chamber by coming into contact with the negative sealing portion of the control valve. The actuator allow the rear chamber to communicate with the atmosphere by bringing the valve seat member into contact with the negative-pressure sealing portion by moving the valve seat member backward and by separating the air sealing portion from the air valve seat by moving the negative-pressure sealing portion backward.

The actuator allows the rear chamber to communicate with the atmosphere by bringing the valve seat member into contact with the negative-pressure sealing portion by moving the valve seat member backward and by separating the air sealing portion from the air valve seat by moving the negative-pressure sealing portion backward. This provides an improved operational mode of the actuator.

The retreat distance of the valve seat member with respect to the power piston can be adjusted by the adjustment of the driving force of the actuator. Thus, the present invention provides a better mode of operation of the valve seat member through operation of the actuator.

The actuator preferably has a solenoid connected to a power source to move the valve seat member backward by attracting it when supplied with power, and the output of the output member is capable of being adjusted in accordance with the attractive force of the solenoid. This improves the operational characteristics of the booster. Additionally, the backward movement distance of the valve seat member can be adjusted in accordance with the attractive force of the solenoid and so the mode of operation of the valve seat member that is caused by the solenoid is improved The engagement member is preferably engaged with the input member in association with forward movement of the power piston with respect to the input member that is caused by the operation of the actuator, thereby allowing the input member to move together with the power piston. The operational characteristics of the engagement member are thus improved.

The engagement member is preferably engaged with the input member as the power piston moves forward with respect to the input member as a result of the operation of the actuator during a non-manipulation state of the input member, and the retreat of the input member, against the restitutive force that is associated with elastic deformation of the engagement member, receiving the reaction force from the reaction force member in association with the operation of the actuator during the non-manipulation state of the input member causes the air sealing portion to come into contact with the air valve seat. This thus allows the rear chamber to be isolated from the atmosphere and also contributes to providing a better mode of operation of the engagement member.

The engagement member is preferably in the form of an elastic key member that is engaged with the power piston to move in the front-rear direction with respect to the power piston by a first predetermined distance and that is engaged with the input member to move in the front-rear direction with respect to the input member by a second predetermined distance. The housing has a first opposed portion that is opposed to and able to contact the rear surface of the key member, the power piston has a second opposed portion that is opposed to and able to contact a front surface of the key member and a third opposed portion that is opposed to and able to contact the rear surface of the key member, and the input member has a fourth opposed portion that is opposed to and able to contact the front surface of the key member and a fifth opposed portion that is opposed to and able to contact the rear surface of the key member.

The engagement member is an elastic key member that is engaged with the power piston so as to be movable in the front-rear direction with respect to the power piston by the first predetermined distance and that is engaged with the input member so as to be movable in the front-rear direction with respect to the input member by the second predetermined distance.

The booster further includes an urging member provided outside the actuator for inhibiting separation of the air valve seat and the air sealing portion from each other that is caused by operation of the actuator. Thus, miniaturization of the actuator and hence the negative-pressure booster itself is possible. Also, the power piston has a hole extending in a radial direction of the power piston and the urging member is provided in the hole, thus contributing to miniaturization of the power piston.

BRIEF DESCRIPTION OF THE DRAWING FIGURES

Additional features and characteristics of the present invention will become more apparent from the following detailed description considered with reference to the accompanying drawing figures in which like elements are designated by like reference numerals and wherein:

FIG. 9 is a characteristic diagram showing the relationship between the current i flowing through the solenoid and the relative movement distance between the power piston and the slider valve in the negative-pressure booster according to the present invention; and FIG. 10 is an input/output characteristic diagram of the negative-pressure booster according to the present invention.

DETAILED DESCRIPTION OF THE PREFERRED EMBODIMENT

Figure 1:
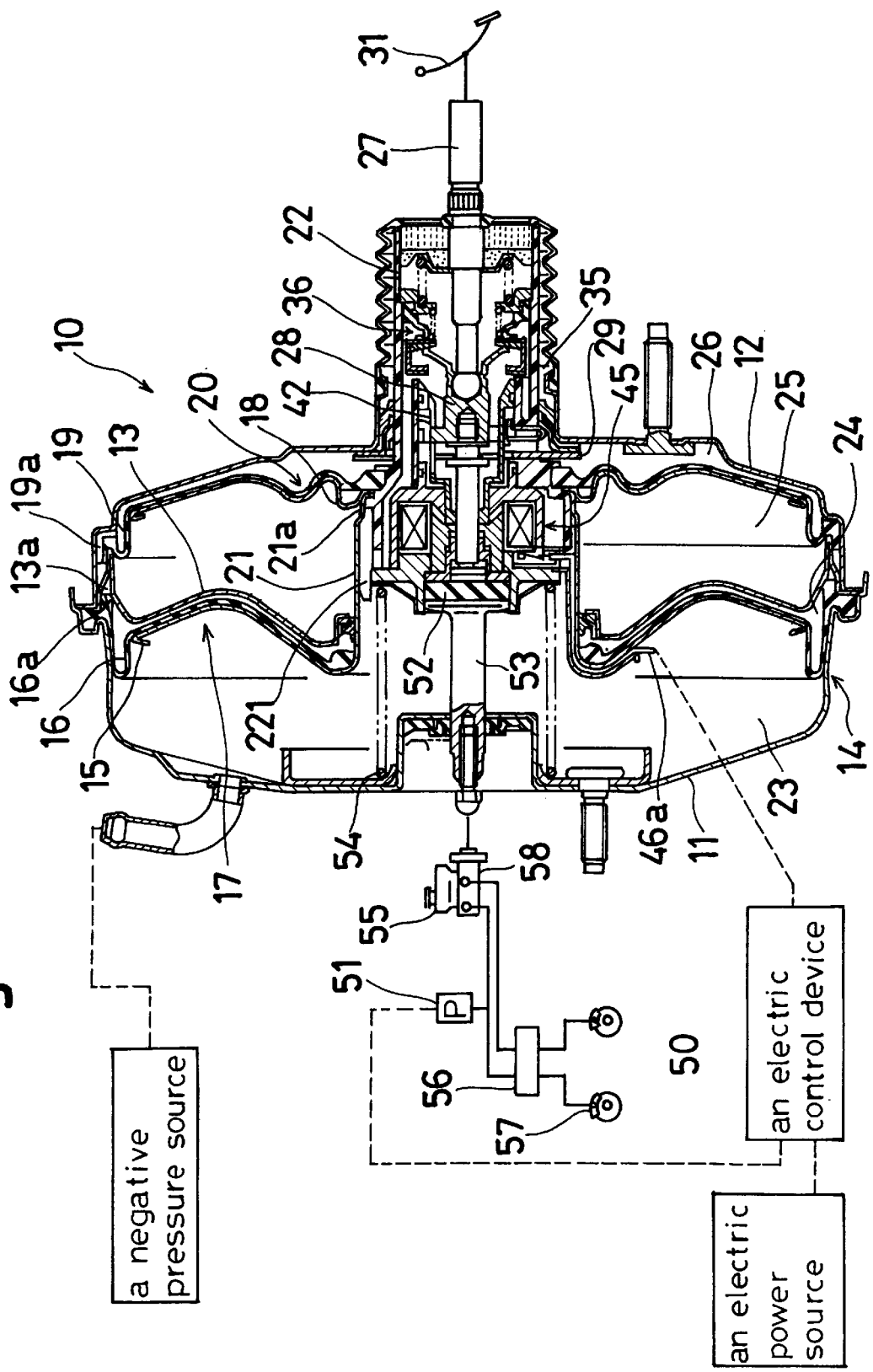
FIG. 1 is a cross-sectional view of a tandem-type negative-pressure booster for a vehicle according to an embodiment of the present invention.

With reference initially to FIG. 1, the vehicle negative-pressure booster 10 according to the present invention includes a housing 14 that is composed of a front shell 11 and a rear shell 12. A partition member 13 is disposed in the interior of the housing 14 and forms a front pressure chamber and a rear pressure chamber inside the housing 14. A front movable wall 17 composed of a metal front plate 15 and a rubber front diaphragm 16 is provided in the front pressure chamber of the housing 14 and is adapted to move axially in an advancing and retreating manner. A rear movable wall 20 composed of a metal rear plate 18 and rubber diaphragm 19 is provided in the rear pressure chamber and is adapted to move axially in an advancing and retreating manner.

The central portion of the front plate 15 that forms a part of the front movable wall 17 possesses an integrally formed cylindrical portion 21 that extends through a centrally located opening in the partition member 13. The portion of the front plate 15 that extends through the opening in the partition member 13 is hermetically sealed to the partition member and is able to slide. A bead portion at the inner peripheral portion of the front diaphragm 16 is hermetically fixed in an air tight manner to the front end portion of the outer circumferential surface of the cylindrical portion 21 of the front plate 15. A bead portion at the outer peripheral portion of the front diaphragm 16 is held in an air tight manner between the outer circumferential portions of the front and rear shells 11, 12 together with the outer peripheral portion of the partition member 13.

A bead portion at the outer peripheral portion of the rear diaphragm 19 is held in an air tight manner between the rear shell 12 and a folded portion provided on the inner side of the outer periphery of the partition member 13. The rear end of the cylindrical portion 21 of the front plate 15 and the inner peripheral portion of the rear plate 18 are fixed to the outer circumferential surface of the portion closer to the front side of a power piston 22 that extends through the central portion of the rear shell 12 in an air tight and slidable manner. A bead portion at the inner peripheral portion of the rear diaphragm 19 is hermetically fixed to the outer circumferential surface of the same portion of the power piston 22.

With the above structure, the front pressure chamber in the housing 14 is divided into a first front chamber 23 and a first rear chamber 24, and the rear pressure chamber in the housing 14 is divided into a second front chamber 25 and a second rear chamber 26. The first front chamber 23 communicates with a negative pressure source 100 such as the engine intake manifold and is always kept at a negative pressure. The second front chamber 25 communicates with the first front chamber 23 via a hole 21a that is formed through the cylindrical portion 21 of the front plate 15 and a groove 221 that is formed in the outer circumferential surface of the front end portion of the power piston 22. The second front chamber 25 is thus also always kept at a negative pressure.

The first rear chamber 24 communicates with the second rear chamber 26 through a groove 16a that is formed in the inner circumferential surface of the bead portion at the outer peripheral portion of the front diaphragm 16, a hole 13a that is formed in the partition member 13, and a groove 19a that is formed in the outer circumferential surface of the bead portion provided at the outer peripheral portion of the rear diaphragm 19.

Figure 2:
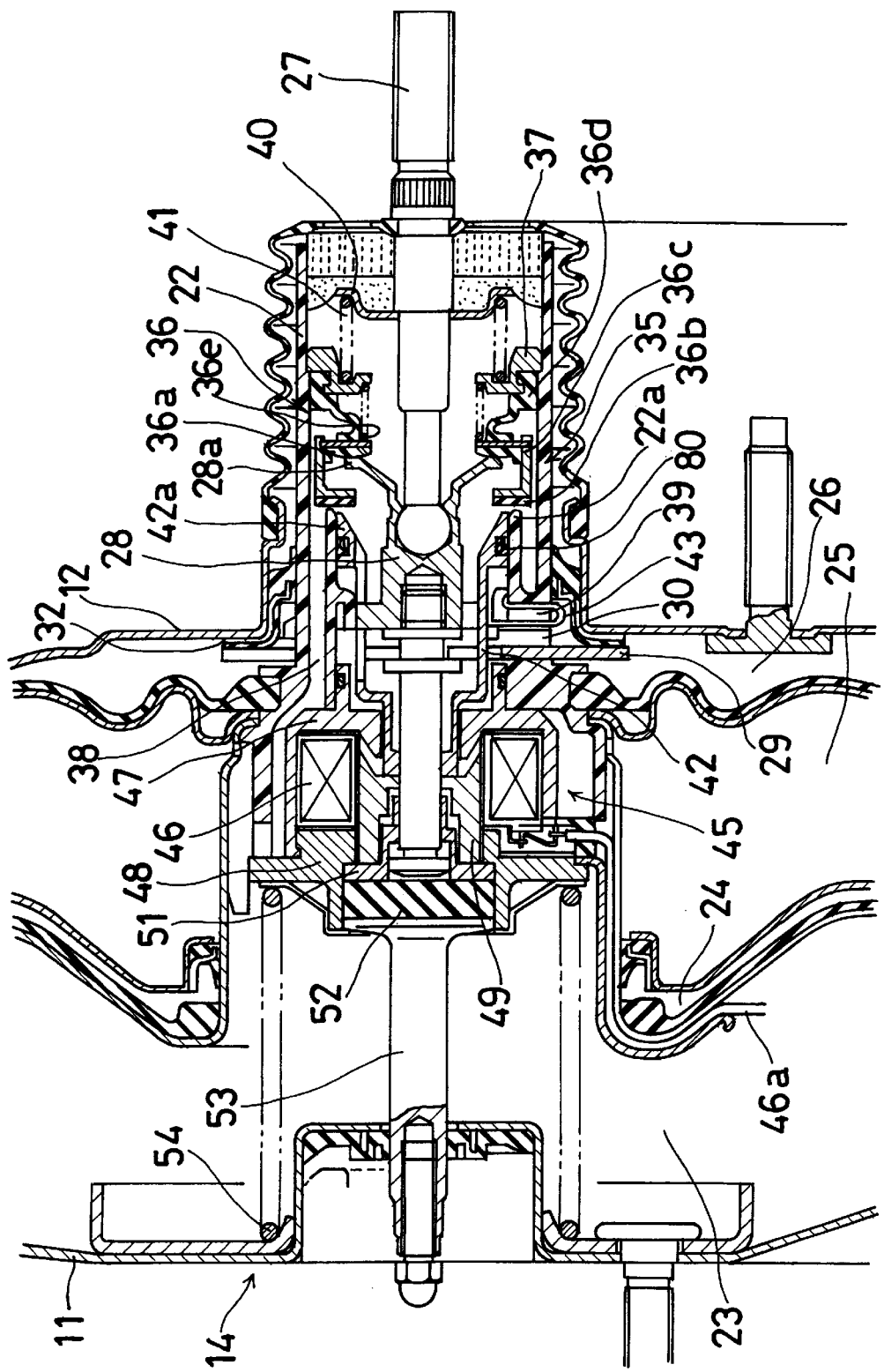
FIG. 2 is an enlarged view of a portion of the tandem-type negative-pressure booster shown in FIG. 1 illustrating the valve mechanism and the input member.

As shown in FIGS. 1 and 2, an input rod 27 is provided inside the power piston 22 so as to be able to advance and retreat with respect to the power piston 22. The input rod 27 is connected, by way of a ball joint located at its front end, to the input member 28, which is guided by the power piston 22 so as to be slidable in the front-rear direction (i.e., in the right-left direction in FIG. 2). The rear end of the input rod 27 is connected to a brake pedal 31.

The power piston 22 is provided with a key member 29 for defining an advancement limit position and a retreat limit position of the input member 28 with respect to the power piston 22. The key member 29 is flexible because it is made of an elastic material, and is approximately straight (i.e., is generally plate-shaped) in a cross-section taken along a radial direction (i.e., the top-bottom direction in FIG.2) of the power piston 22. The key member 29 is inserted in a radially extending hole 30 that is formed in the power piston 22, and is engaged with the power piston 22 so that the key member 29 does not drop therefrom.

Figure 5:
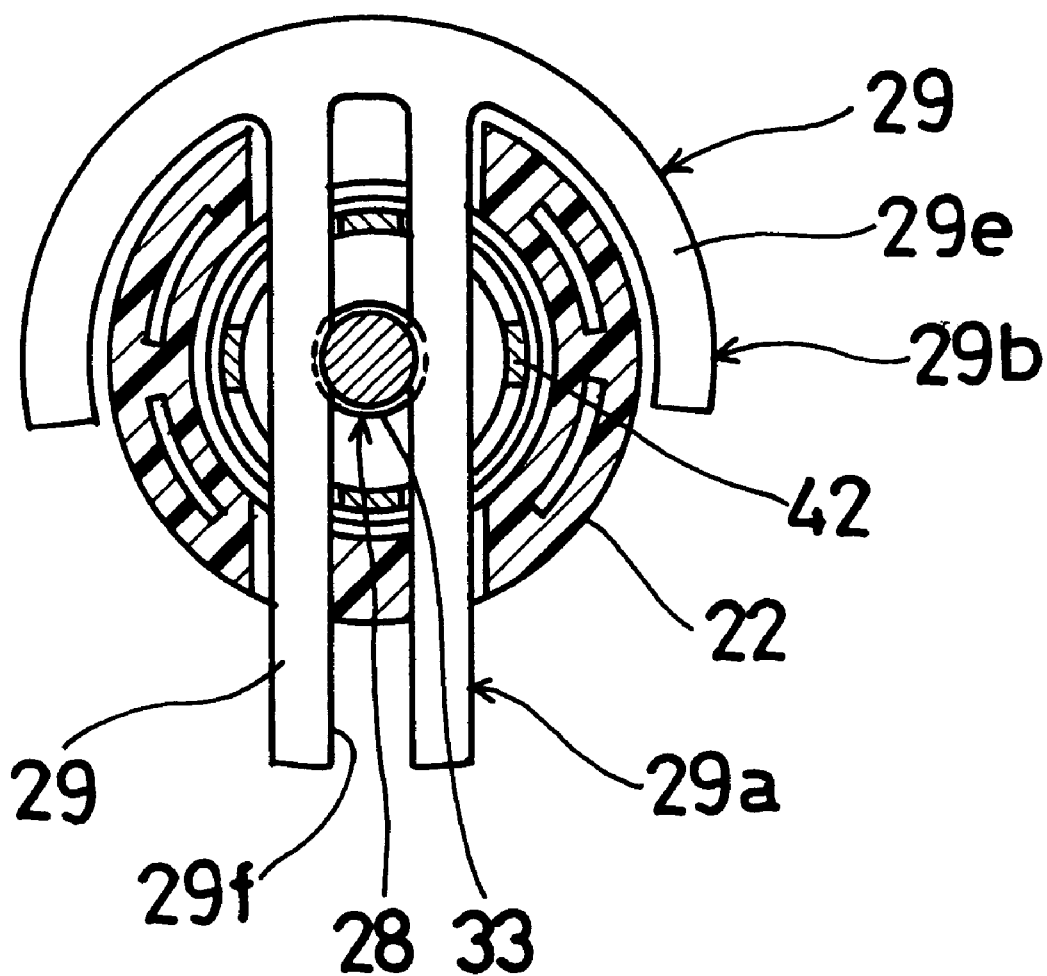
FIG. 5 is a cross-sectional view of the power piston shown in FIG. 4.

As shown in FIGS. 1–5, the key member 29 is defined by several integrally formed parts including a planar plate portion 29a that extends in a radial direction (i.e., the top-bottom direction in FIGS. 4 and 5) of the power piston 22 and a semicircular arc portion 29b that is connected to one end of the plate portion 29a. The plate portion 29a is formed with a slit 29f that extends radially with respect to the power piston 22. The slit 29f thus divides the plate portion 29a into two spaced apart forks. The plate portion 29a extends from the inside of the arc portion 29b toward the open side of the arc portion 29b as seen in FIG. 5.

The front-rear thickness of the key member 29 is set to be smaller than the front-rear (i.e., axial) dimension of the radial hole 30. The key member 29, specifically the front surface 29c of the plate portion 29a, is able to contact the front wall 223 (second opposing portion) that forms a part of the circumferential wall defining or surrounding the radial hole 30 and that is opposed to the front surface 29c. The rear surface 29d of the plate portion 29a is able to contact the rear wall 224 that forms a part of the circumferential wall defining or surrounding the radial hole 30 and that is opposed to the rear surface 29d. The rear surface 29e of the arc portion 29b is able to contact an engagement portion 222 (third opposing portion) that is provided on the outer circumferential surface of the power piston 22. The engagement portion 222 is positioned in opposing relation to the rear surface 29e.

Figure 3:
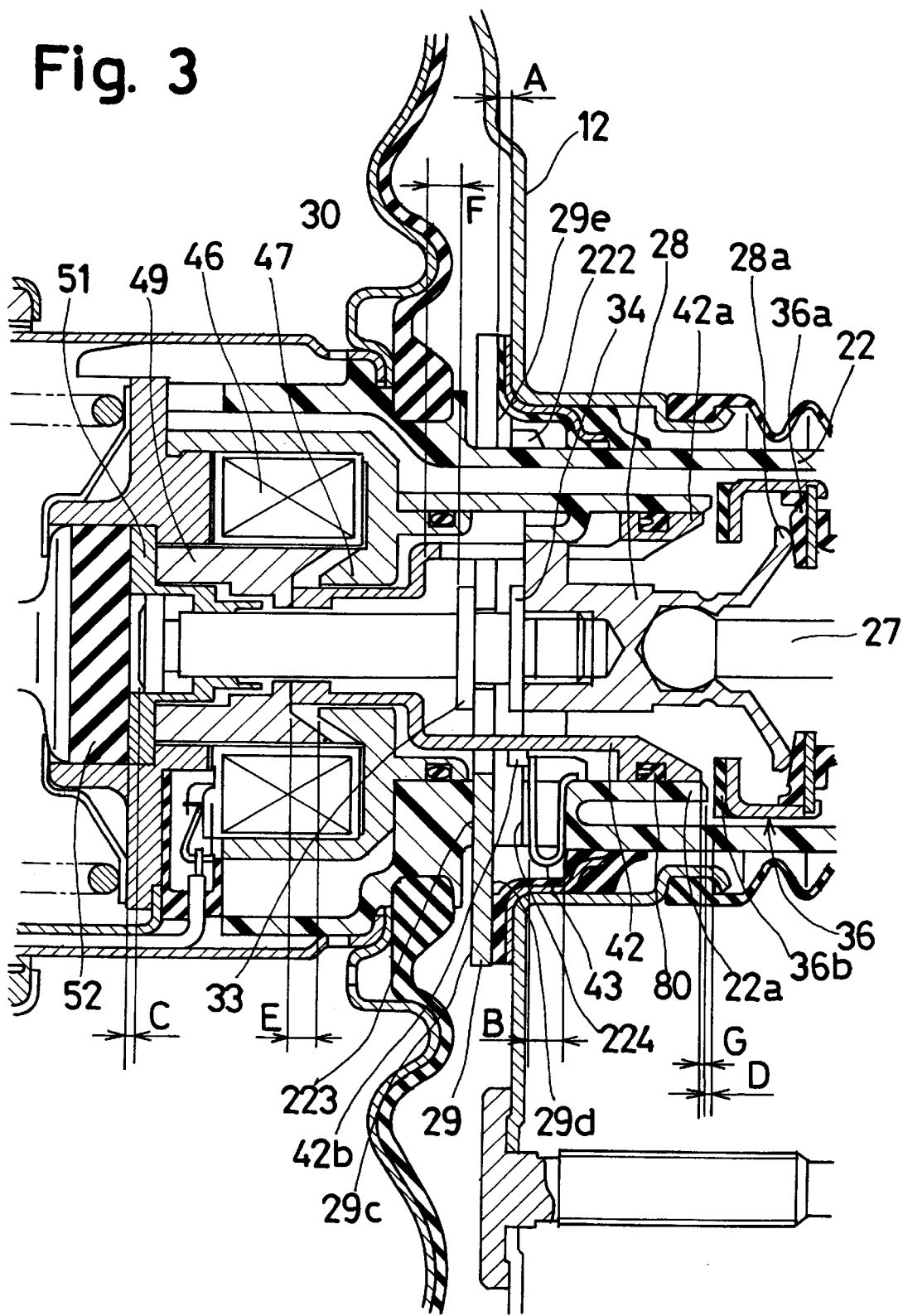
FIG. 3 is an enlarged view of a portion of the valve mechanism shown in FIG. 2 in the vicinity of the key member.
Figure 4:
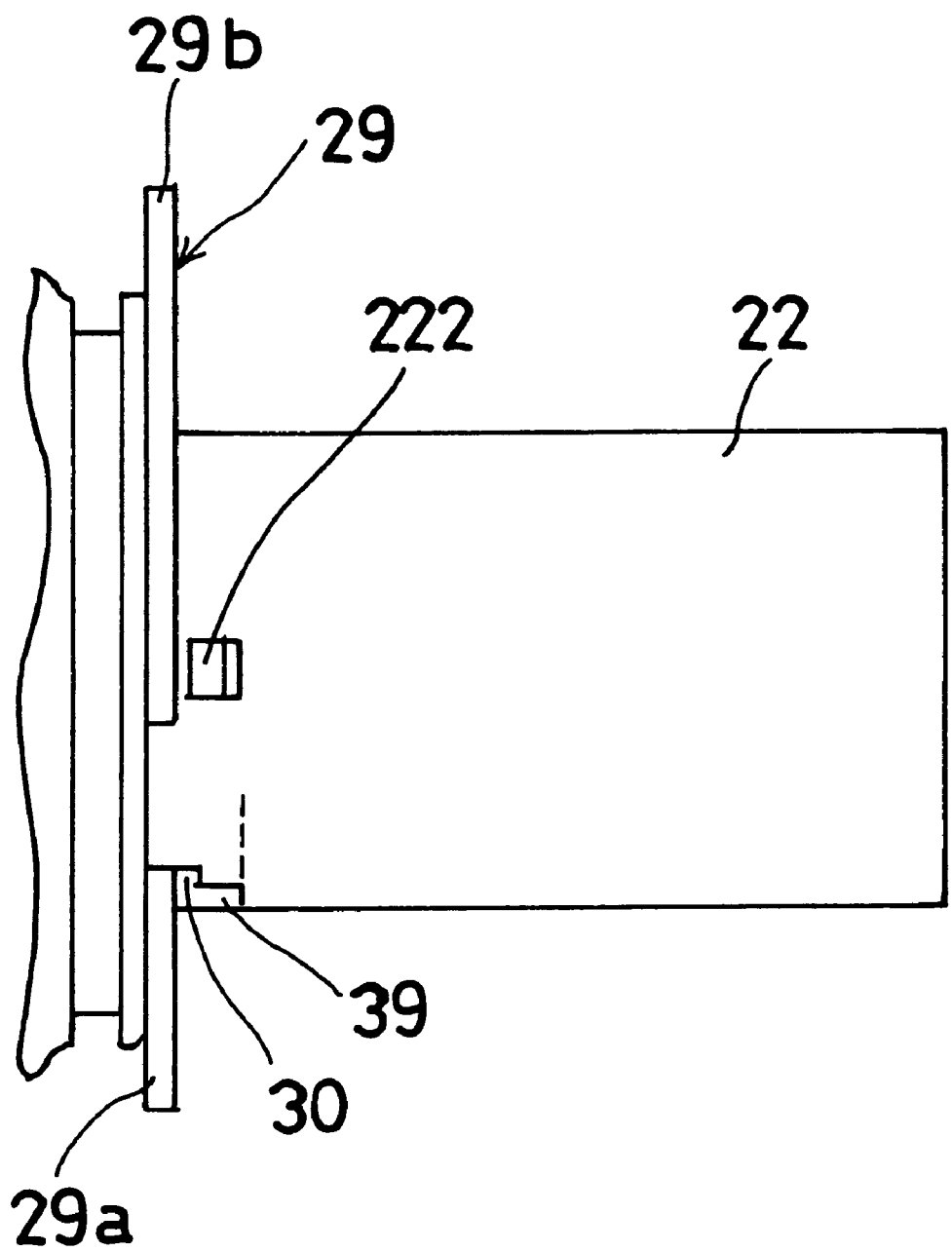
FIG. 4 is a side view of a part of the power piston shown in FIG. 2.

The difference between the axial dimension of the radial hole 30 in the front-rear direction (i.e., the right-left direction in FIG. 3) and the axial or front-rear thickness of the key member 29 is set to be larger than the difference between the front-rear or axial thickness of the key member 29 and the front-rear or axial distance between the front wall 223 of the radial hole 30 and the engagement portion 222, that is a distance A shown in FIG. 3. Therefore, the key member 29 is movable in the front-rear or axial direction with respect to the power piston 22 over the distance A shown in FIG. 3 which forms a first predetermined distance.

The key member 29, specifically the rear surface 29e of the arc portion 29b (located outside the power piston 22), is able to contact the rear shell 12 (first opposing portion) via a damper member 32. A retreat limit position of the power piston 22 with respect to the housing 14 is the position at which the front wall 223 of the radial hole 30 is in contact with the front surface 29c of the plate portion 29a of the key member 29 and the rear surface 29e of the arc portion 29b of the key member 29 is contacted by the rear shell 12 via the damper member 32.

The input member 28 is fitted into the plate portion 29a of the key member 99 by being positioned within the slit 29f so that the axial direction of the input member 28 is perpendicular to the radially extending direction of the slit 29f. The plate portion 29a is located between two radially outwardly extending flange portions of the input member 28, specifically a front flange portion 33 forming a fourth opposing portion and a rear flange portion 34 forming a fifth opposing portion. Therefore, the key member 29 is engaged with the input member 28 so as to be movable in the front-rear or axial direction with respect to the input member 28 over a distance (second predetermined distance) that is equal to the difference between the front-rear or axial thickness of the key member 29 and the distance between the two flange portions 33, 34.

A first retreat limit position of the input member 28 with respect to the power piston 22 is the position at which the rear surface of the front flange portion 33 is in contact with the front surface 29c of the plate portion 29a of the key member 29 and the rear surface 29e of the arc portion 29b of the key member 29 is in contact with the engagement portion 222 of the power piston 22. An advancement limit position of the input member 28 with respect to the power piston 22 is the position at which the front surface of the rear flange portion 34 is in contact with the rear surface 29d of the plate portion 29a of the key member 29 and the front surface 29c of the plate portion 29a of the key member 29 is in contact with the front wall 223 of the radial hole 30.

A valve mechanism 35 is provided inside the power piston 22 for switching, in accordance with the front-rear position of the input member 28 with respect to the power piston 22, between an output decreasing operation state in which the second rear chamber 26 communicates with the first front chamber 23 and is isolated from the atmosphere, an output holding operation state in which the second rear chamber 26 is isolated from the first front chamber 23 and the atmosphere, and an output increasing operation state in which the second rear chamber 26 is isolated from the first front chamber 23 and communicates with the atmosphere.

The valve mechanism 35 is composed of a generally annular air valve seat 28a that is integral with the rear portion of the input member 28 and directed rearwardly, a generally annular negative-pressure valve seat 22a that is integral with the power piston 22 and directed rearward, and a control valve 36. The control valve 36 is defined by several integrated parts including a generally annular air sealing portion 36a that is opposed to the air valve seat 28a for alternately contacting and being separated from the valve seat 28a, and a generally annular negative-pressure sealing portion 36b that is opposed to the negative-pressure valve seat 22a for alternately contacting and being separated from the negative-pressure valve seat 22a.

The control valve 36 includes a movable portion 36c that is provided with the air sealing portion 36a and the negative-pressure sealing portion 36b as integral parts, a fixed portion 36d that is secured in an air tight manner to the power piston 22 by a retainer 37, and a valve spring 36e that urges the movable portion 36c forward (i.e., towards the left with respect to the illustration in FIG. 2).

The power piston 22 is formed with a vacuum passage 38 that connects the valve mechanism 35 with the first front chamber 23 and an air passage 39 that connects the valve mechanism 35 and the second rear chamber 26. The space inside the power piston 22 and on the inner side of the fixed portion 36d of the control valve 36 communicates with the atmosphere via the rear opening of the power piston 22.

By virtue of the valve mechanism 35, the second rear chamber 26 is isolated from the atmosphere by contact of the air valve seat 28a with the air sealing portion 36a, and is adapted to communicate with the atmosphere when the air valve seat 28a separates from the air sealing portion 36a. The first front chamber 23 is isolated from the second rear chamber 26 as a result of the negative-pressure valve seat 22a contacting the negative-pressure valve sealing portion 36b, and is adapted to communicate with the second rear chamber 26 when the negative-pressure valve seat 22a is separated from the negative-pressure sealing portion 36b.

A spring 41 is provided between the retainer 37 and another retainer 40 that is engaged with the input rod 27 to rearwardly urge the input rod 27 and hence the input member 28. When the brake pedal 31 is not operated, that is in the initial state shown in FIG. 3, the spring 41 brings the air valve seat 28a into contact with the air sealing portion 36a and also keeps the negative-pressure sealing portion 36b separated from the negative-pressure valve seat 22a by a distance D.

A slider valve 42 forming a valve seat member and generally shaped like a stepped cylinder is provided inside the power piston 22 on the inner side of the negative-pressure valve seat 22a so as to be movable in the front-rear or axial direction with respect to the power piston 22. The slider valve 42, specifically an annular auxiliary negative-pressure valve seat 42a that is formed at the rear end of the slider valve 42, is able to contact and be separated from the negative-pressure sealing portion 36b of the control valve 36. When the auxiliary negative-pressure valve seat 42a is brought into contact with the negative-pressure sealing portion 36b, the first front chamber 23 and the second rear chamber 26 are isolated from each other.

The slider valve 42 has a sealing member 80 on its outer circumferential surface. The slider valve 42 contacts the inner peripheral surface of the power piston 22 in an air tight and slidable manner via the sealing member 80.

A spring 43 is provided between the slider valve 42 and the power piston 22. The spring 43 is disposed in the air passage 39 that is formed in the power piston 22 and that extends in the radial direction (i.e., in the top-bottom direction in FIG. 3). The spring 43 is adapted to urge the slider valve 42 forward with respect to the power piston 22. As shown in FIG. 3, a distance B exists between the front and rear surfaces of the spring 43.

Figure 6:
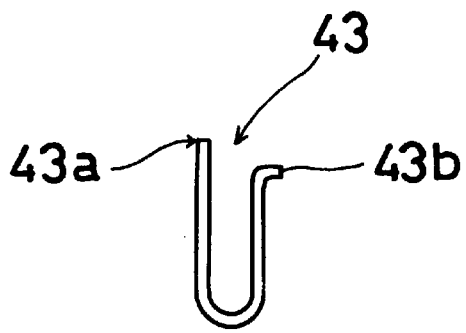
FIG. 6 is an enlarged view of the spring shown in FIG. 3.
Figure 7:
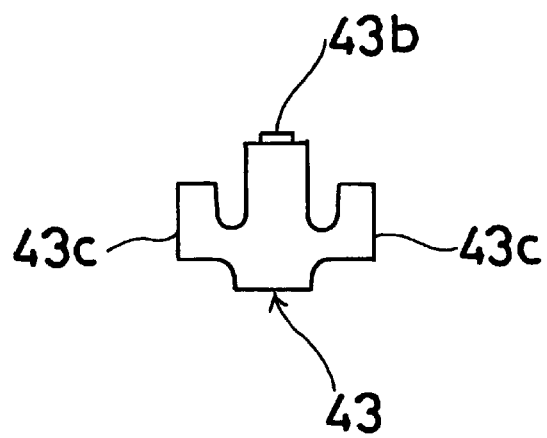
FIG. 7 is a rear view of the spring shown in FIG. 6.
Figure 8:
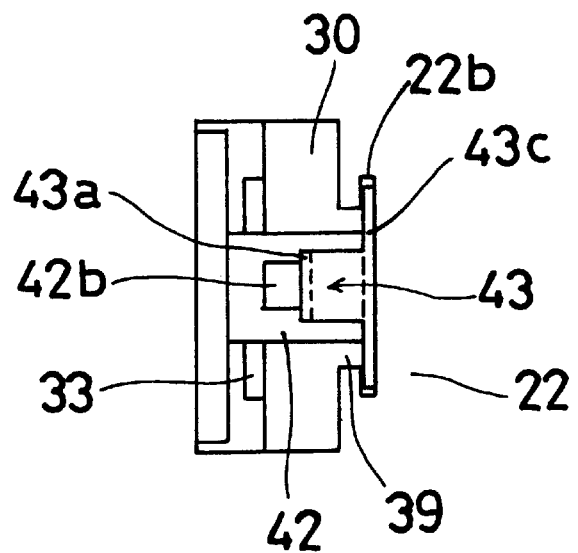
FIG. 8 is a side view of the spring and adjacent members shown in FIG. 3.

As seen in FIGS. 6–8, the spring 43 has a general shape obtained by curving a flat plate. The spring 43 possesses engagement protrusions 43c that extend from its rear surface. A front opening end portion 43a of the spring 43 engages an engagement portion 42b that is formed on the outer circumferential surface of the slider valve 42, the rear surface of the spring 43 contacts the circumferential wall of the air passage 39, and a rear opening end portion 43b of the spring 43 engages the opening peripheral portion, on the side of the valve mechanism 35, of the air passage 39 of the power piston 22. The spring 43 is fixed to the power piston 22 in such a manner that the engagement protrusions 43c are fitted into engagement grooves 22b that are formed in the outer circumferential surface of the power piston 22.

An actuator 45 for effecting retreating movement of the slider valve 42 against the urging force of the spring 43 is provided inside the front portion of the power piston 22. The actuator 45 is composed of a solenoid coil 46, a yoke 47 made of magnetic material, a reaction member accommodating member 48 also serving as a yoke that is made of magnetic material, and a plunger 49 made of magnetic material.

The solenoid coil 46, the yoke 47, and the yoke/reaction member accommodating member 48 are fixed to the power piston 22 while the rear surface of the plunger 49 is adapted to contact the front end surface of the slider valve 42. The solenoid coil 46 is electrically connected, via a lead wire 46a, to an electronic control device 50 that is provided outside the housing 14 and is electrically connected, via the electric control device 50, to an electric power source 101 as shown in FIG. 1.

When the solenoid coil 46 is not energized (i.e., the actuator 45 is not in operation), the front end surface of the slider valve 42 is brought into contact with the plunger 49 by the spring 43 and the front end surface of the plunger 49 is kept at the position shown in FIG. 2 where it is in contact with a guide member 51 that is in a fixed relationship with the yoke/reaction member accommodating member 48 and that slidably guides the front portion of the input member 28. The auxiliary negative-pressure valve seat 42a of the slider valve 42 is located at the front side of the negative-pressure valve seat 22a of the power piston 22, and is set back from the front end of the negative-pressure valve seat 22a by a distance G as shown in FIG. 3.

When the solenoid-coil 46 is energized (i.e., the actuator 45 is in operation), an electromagnetic attraction force acts between the yoke 47 and the plunger 49, whereby the plunger 49 is moved rearward (i.e., towards the right as seen with reference to the illustration in FIG. 3). As the plunger 49 moves rearward, the slider valve 42 retreats against the urging or biasing force of the spring 43.

The maximum retreat distance of the slider valve 42 corresponds to the distance E between the yoke 47 and the plunger 49 shown in FIG. 3. In the state in which the slider valve 42 is retreated, the auxiliary negative-pressure valve seat 42a of the slider valve 42 is located at the rear side of the negative-pressure valve seat 22a of the power piston 22.

A disc-shaped reaction disc 52 made of rubber is provided inside the yoke/reaction member accommodating member 48 on the front side of the guide member 51. The rear end portion of an output rod 53 that penetrates through the central portion of the front shell 11 of the housing 14 in an air tight and slidable manner is positioned in front of the reaction disc 52.

As is well known, the reaction disc 52 transmits the advancing force of the power piston 22 and that of the input member 28 to the output rod 53, and also applies a reaction force corresponding in magnitude to the output of the output rod 53 to the input member 28 so as to cause the input member 28 to retreat.

A return spring 54 is provided in the central portion of the first front chamber 23. The return spring 54 is adapted to retreat, with respect to the housing 14, the power piston 22 and both movable walls 17, 20 that are connected to the power piston 22.

The output rod 53 is operatively connected to a piston (not shown) of a master cylinder 58. As shown in FIG. 1, the master cylinder 58 is provided with a reservoir tank 55. An actuator section 56 of an ABS (antilock brake system), TRC (traction control), and oversteer/understeer preventing control is connected to the master cylinder 58 via liquid pressure pipes or hydraulic lines.

Wheel cylinders 57 attached to the respective wheels are connected to the actuator section 56 via liquid pressure pipes or hydraulic lines. A liquid pressure sensor 51 for detecting the pressure in the liquid pressure pipes and hence the master cylinder 58 is attached to the liquid pressure pipes between the master cylinder 58 and the actuator section 56.

In the initial state shown in FIG. 3, a clearance (distance F) exists between the inner surface of the step portion of the slider valve 42 and the front flange portion 33 of the input member 28, and a clearance (distance C) exists between the rear surface of the reaction disc 52 and the front surface of the input member 28. The clearances shown in FIG. 3 are set such that G+D+A<E<F and E<B.

FIG. 9 is a characteristic diagram showing the relationship between the current i flowing through the solenoid 46 and the relative movement distance between the power piston 22 and the slider valve 42 in the negative-pressure booster 10 according to the present invention. As shown in FIGS. 1–9, when current is caused to flow through the solenoid 46, the plunger 49 and hence the slider valve 42 are moved rearward against the urging force of the spring 43.

A current i1 needs to flow through the solenoid 46 for the plunger 49 and the slider valve 42 to retreat with respect to the power piston 22 by a distance S1 against the urging force of the spring 43. A current i2 needs to flow through the solenoid 46 for the plunger 49 and the slider valve 42 to retreat with respect to the power piston 22 by a distance S2 against the urging force of the spring 43. A current i3 needs to flow through the solenoid 46 for the plunger 49 and the slider valve 42 to retreat with respect to the power piston 22 by a distance S3 against the urging force of the spring 43. A current i4 needs to flow through the solenoid 46 for the plunger 49 and the slider valve 42 to retreat with respect to the power piston 22 by a distance S4 against the urging force of the spring 43. A current i5 needs to flow through the solenoid 46 for the plunger 49 and the slider valve 42 to retreat with respect to the power piston 22 by a distance S5 against the urging force of the spring 43. A current i6 needs to flow through the solenoid 46 for the plunger 49 and the slider valve 42 to retreat with respect to the power piston 22 by a distance S6 against the urging force of the spring 43.

That is, the rearward movement distance of the plunger 49 and the slider valve 42 with respect to the power piston 22 increases as the current supplied to the solenoid 46, and hence the attractive force of the solenoid 46, increases. Thus, the relative movement distance of the plunger 49 and the slider valve 42 with respect to the power piston 22 depends on the current supplied to the solenoid 46 and hence the attractive force of the solenoid 46.

The operation of the negative pressure booster according to the present invention is as follows. The operational state of the negative pressure booster shown in FIGS. 1–3 is a state in which the brake pedal 31 is not pushed and the actuator 45 is not in operation. That is, the operational state illustrated in FIGS. 1–3 is the output decreasing operation state in which the valve mechanism 35 causes the second rear chamber 26 to communicate with the first front chamber 23 while at the same time isolating the second rear chamber 26 from the atmosphere. In this state, the air valve seat 28a is in contact with the air sealing portion 36a, and the negative-pressure valve seat 22a and the auxiliary negative-pressure valve seat 42a of the slider valve 42 are separated from the negative-pressure sealing portion 36b. The pressure in the first rear chamber 24 and the second rear chamber 26 is equal to the pressure in the first front chamber 23.

Therefore, no advancing force acts on the movable walls 17, 20 and the power piston 22. The power piston 22 and both movable walls 17, 20 that are connected to the power piston 22 are maintained, by the return spring 54, at the retreat limit positions with respect to the housing 14 where the front wall 223 of the radial hole 30 in the power piston 22 is in contact with the front surface 29c of the plate portion 29a of the key member 29, and the rear surface 29e of the arc portion 29b of the key member 29 is in contact with the rear shell 12 by way of the damper member 32.

FIG. 10 is an input/output characteristic diagram of the negative-pressure booster 10 of this embodiment in which the vertical axis represents the output and the horizontal axis represents the input. As shown in FIG. 10, if the driver pushes the brake pedal 31 with an input Fi1 to effect an ordinary braking operation, the input rod 27 and hence the input member 28 are advanced with respect to the power piston 22.

As the input member 28 moves, the movable portion 36c of the control valve 36 is urged forward by the valve spring 36e and is thereby advanced together with the input member 28. As a result, the negative-pressure sealing portion 36b of the control valve 36 contacts the negative-pressure valve seat 22a of the power piston 22 to thereby isolate the vacuum passage 38 from the air passage 39 so that the second rear chamber 26 is isolated from the first front chamber 23. That is, the valve mechanism 35 switches from the output decreasing operation state to an output holding operation state.

In the state that the negative-pressure valve seat 22a and the negative-pressure sealing portion 36b are in contact with each other, the input member 28 is advanced with respect to the power piston 22 by a distance D and a gap of a distance C–D remains between the front end surface of the input member 28 and the rear surface of the reaction disc 52. When the input rod 27 and the input member 28 are advanced further, the air valve seat 28a of the input member 28 is separated from the air sealing portion 36a of the control valve 36, whereby the air passage 39 communicates with the atmosphere through the clearance between the air valve seat 28a and the air sealing portion 36a. As a result, the second rear chamber 26 communicates with the atmosphere and the valve mechanism 35 switches to the output increasing operation state.

Therefore, atmospheric air flows into the second rear chamber 26 and then flows into the first rear chamber 24 via the second rear chamber 26, whereby the pressure in both rear chambers 24, 26 increases. This creates a pressure differential between the first front chamber 23 and the first rear chamber 24 as well as a pressure differential between the second front chamber 25 and the second rear chamber 26. By virtue of the pressure differential between the first front chamber 23 and the first rear chamber 24, an advancing force acts on the first movable wall 17. Similarly, an advancing force acts on the second movable wall 20 by virtue of the pressure difference between the second front chamber 25 and the second rear chamber 26. Thus, an a advancing force acts on the power piston 22 as a result of the pressure differential between the front chambers 23, 25 and the rear chambers 24, 26.

The advancing forces described above are transmitted from the power piston 22 to the output rod 53 via the yoke/reaction member accommodating member 48 of the actuator 45, the guide member 51, and the reaction disc 52. Both movable walls 17, 20, the power piston 22, and the output rod 53 start to advance together with respect to the housing 14, and the master cylinder 58 begins to operate.

At this time, the power piston 22 advances also with respect to the input member 28, whereby the air sealing portion 36a of the control valve 36 comes close to the air valve seat 28a. The reaction disc 52 is deformed, that is, compressed, by the power piston 22 and the output rod 53 and enters the inside of the guide member 51 so that the gap between the rear surface of the central portion of the reaction disc 52 and the front end surface of the input member 28 is reduced. The reaction disc 52 contacts the front end surface of the input member 28 and transmits the advancing force of the power piston 22 and that of the input member 28 to the output rod 53. Further, the reaction disc 52 applies a reaction force corresponding to an output of the output rod 53 to the input member 28 to cause the input member 28 to retreat with respect to the power piston 22.

As a result of the advancement of the power piston 22 with respect to the input member 28 and the retreating movement of the input member 28 that results from the reaction force from the reaction disc 52, the air sealing portion 36a of the control valve 36 again comes into contact with the air valve seat 28a in due course, whereby the air passage 39 is isolated from the atmosphere and the flow of atmospheric air into both of the rear chambers 24, 26 stops so that the valve mechanism 35 is switched to the output holding operation state.

At this time, the input that is applied from the brake pedal 31 to the input member 28 has a value Fi1 as shown in FIG. 10 and the output that is applied from the output rod 53 to the master cylinder 58 has a value Fo1 as seen in FIG. 10.

If the input that is applied from the brake pedal 31 to the input member 28 in the state in which the valve mechanism 35 assumes the output holding operation state with the generation of the output force Fo1 is increased to a value that is smaller than Fi2 as seen in FIG. 10, the input member 28 is advanced with respect to the power piston 22 and the air valve seat 28a is again separated from the air sealing portion 36a of the control valve 36 so that the valve mechanism 35 switches to the output increasing operation state. Atmospheric air thus flows into both rear chambers 24, 26, the pressure in the rear chambers 24, 26 rises, the advancing force of the movable walls 17, 20 and the power piston 22 increases, and both movable walls 17, 20, the power piston 22, and the output rod 53 further advance with respect to the housing 14.

As a result of the advancement of the power piston 22 with respect to the input member 28 and the rearward movement of the input member 28 that results by virtue of the reaction force from the reaction disc 52 to the input member 28 in association with the advancement of the power piston 22, the air valve seat 28a once approaches the air sealing portion 36a of the control valve 36 and then comes into contact with the air sealing portion 36a of the control valve 36 again, whereby the flow of atmospheric air into both rear chambers 24, 26 ceases. The valve mechanism 35 thus changes to the output holding operation state and the increase of the advancing force of both movable walls 17, 20 and the power piston 22 stops.

If the input that is applied from the brake pedal 31 to the input member 28 in the state in which the valve mechanism 35 assumes the output holding operation state is decreased to a value that is larger than Fi1 as seen FIG. 10, the input member 28 retreats with respect to the power piston 22. As the input member 28 retreats, the movable portion 36c of the control valve 36 retreats with respect to the power piston 22 and the negative-pressure sealing portion 36b is separated from the negative-pressure valve seat 22a so that the valve mechanism 35 switches to the output decreasing operation state.

As a result of the separation of the negative-pressure valve seat 22a from the negative-pressure sealing portion 36b, the vacuum passage 38 once again communicates with the air passage 39 through the clearance between the negative-pressure valve seat 22a and the negative-pressure sealing portion 36b and the clearance between the auxiliary negative-pressure valve seat 42a and the negative-pressure sealing portion 36b. Because both of the rear chambers 24, 26 are in communication with the first front chamber 23, atmospheric air in both of the rear chambers 24, 26 is discharged via the first front chamber 23 because of the existence of the negative-pressure source 100. The pressure in both rear chambers 24, 26 is thus lowered.

Therefore, the advancing force of both movable walls 17, 20 and the power piston 22 is decreased and hence the movable walls 17, 20, the power piston 22, and the output rod 53 retreat with respect to the housing 14. At this time, the power piston 22 retreats also with respect to the input member 28, and the negative-pressure valve seat 22a approaches the negative-pressure sealing portion 36b of the control valve 36 and then comes into contact with the negative-pressure sealing portion 36b. As a result, the flow of atmospheric air from both rear chambers 24, 26 into the first front chamber 23 stops and the valve mechanism 35 switches to the output holding operation state. The decrease of the advancing force of both movable walls 17, 20 and the power piston 22 thus stops.

The input value Fi2 shown in FIG. 10 represents an input value with which the pressure in both rear chambers 24, 26 reaches atmospheric pressure. Within the input value range of Fi1 to Fi2, the variation of the output that is applied from the output rod 53 to the master cylinder 58 is larger than the variation of the input that is applied to the input member 28. The ratio of the output variation to the input variation is equal to the ratio of the area of the rear surface of the reaction disc 52 to the contact area of the rear surface of the reaction disc 52 and the front end surface of the input member 28.

In FIG. 10, the output has a value Fo2 when the input is Fi2. When the input is farther increased from the value Fi2, the output increases by the same value as the increment of increase of the input. In FIG. 10, a force variation per unit length on the vertical axis is larger than that on the horizontal axis. If FIG. 10 were drawn so that a force variation per unit length on the vertical axis is equal to that on the horizontal axis, the line representing the input/output relationship in the input range larger than the value FIG. 2 would have a slope of 45°.

In a state in which the brake pedal 31 is pushed and the input member 28, the movable walls 17, 20, the power piston 22, and the output rod 53 are advancing with respect to the housing 14, the rear surface 29e of the arc portion 29b of the key member 29 is separated from the rear shell 12. When the valve mechanism 35 is in the output holding operation state, the distance between the rear surface 29e of the arc portion 29b of the key member 29 and the engagement portion 222 of the power piston 22 is equal to A+D and as for the first retreat limit position the input member 28 can move backward with respect to the power piston 22 by A+D.

For example, when the driver cancels a pushing manipulation to cease an ordinary braking operation by gradually decreasing the pushing amount of the brake pedal 31 in a state in which the negative-pressure booster 10 is producing an output value Fo3 for an input value Fi3 and the valve mechanism 35 assumes the output holding operation state, the reaction force applied from the reaction disc 52 and the urging force of the spring 41 cause the input member 28 to retreat with respect to the power piston 22 to the first retreat limit position with respect to the power piston 22. That is, the position at which the rear surface of the front flange portion 33 is in contact with the front surface 29c of the plate portion 29a of the key member 29 and the rear surface 29e of the arc portion 29b of the key member 29 is in contact with the engagement portion 222 of the power piston 22.

As a result, the movable portion 36c of the control valve 36 retreats with respect to the power piston 22 and the negative-pressure sealing portion 36b is separated from the negative-pressure valve seat 22a by a distance A +D. The valve mechanism 35 thus switches to the output decreasing operation state, whereby atmospheric air in both of the rear chambers 24, 26 is discharged via the first front chamber 23 because of the existence of the negative-pressure source 100. Both movable walls 17, 20, the power piston 22, and the output rod 53 retreat with respect to the housing 14 in accordance with a pressure reduction in both of the rear chambers 24, 26.

At this time, because the input to the brake pedal 31 and hence the input member 28 gradually decreases, the input member 28 retreats gradually, and the power piston 22 and the input member 28 retreat approximately at the same speed. Therefore, as the power piston 22 retreats, the input member 28 retreats together with the power piston 22 while maintaining the state in which the input member 28 is located at the first retreat limit position with respect to the power piston 22.

As the input member 28, both movable walls 17, 20, the power piston 22, and the output rod 53 retreat with respect to the housing 14, the rear surface 29e of the arc portion 29b of the key member 29 comes into contact with the rear shell 12 in due course, whereupon the retreat of the input member 28 with respect to the housing 14 stops.

On the other hand, the retreat of both movable walls 17, 20, the power piston 22, and the output rod 53 with respect to the housing 14 continues until the power piston 22 reaches the retreat limit position with respect to the housing 14, that is the position where the front wall 223 of the radial hole 30 of the power piston 22 contacts the front surface 29c of the plate portion 29a of the key member 29 and the rear surface 29e of the arc portion 29b of the key member 29 is in contact with the rear shell 12.

As a result, a non-operation state is established in which the negative-pressure valve seat 22a of the power piston 22 is located close to the negative-pressure sealing portion 36b of the control valve 36, with a small gap existing between the negative-pressure valve seat 22a and the negative-pressure sealing portion 36b.

Because the gap between the negative-pressure valve seat 22a and the negative-pressure sealing portion 36b is small, the advancement distance of the input member 28 that is necessary for the valve mechanism 35 to switch from the output decreasing operation state via the output increasing operation state via the output holding operation state at the time of the next operation is small. Therefore, play that will occur when the brake pedal 31 is pushed or operated will be small, which means a quick response is achieved.

By virtue of its elasticity, the reaction disc 52 returns to the state shown in FIG. 2 when the force transmitted between the power piston 22 and the output rod 53 decreases.

For example, when the driver cancels a pushing manipulation to cease an ordinary braking operation by quickly decreasing the pushing amount applied to the brake pedal 31 at a time when the input to the brake pedal 31 is in a state that the negative-pressure booster 10 is producing an output value Fo3 for an input value Fi3 and the valve mechanism 35 is in the output holding operation state, the reaction force applied from the reaction disc 52 and the urging force of the spring 41 exerted via the input rod 27 initially cause the input member 28 to retreat with respect to the power piston 22 to the first retreat limit position with respect to the power piston 22, that is the position at which the rear surface of the front flange portion 33 is in contact with the front surface 29c of the plate portion 29a of the key member 29 and the rear surface 29e of the arc portion 29b of the key member 29 is in contact with the engagement portion 222 of the power piston 22.

Therefore, as described above, the negative-pressure valve seat 22a and the negative-pressure sealing portion 36b are separated from each other by the distance A+D, whereby atmospheric air in both of the rear chambers 24, 26 is discharged via the first front chamber 23 because of the existence of the negative-pressure source 100. The movable walls 17, 20, the power piston 22, and the output rod 53 retreat with respect to the housing 14 in accordance with the pressure reduction in both of the rear chambers 24, 26.

At this time, because the input to the brake pedal 31 and hence the input member 28 quickly decreases, the input member 28 retreats faster than the power piston 22. Therefore, the reaction force of the reaction disc 52 and the urging force of the spring 41 cause the input member 28 to retreat from the first retreat limit position to a position that is rearwardly of the first retreat limit position while bending the plate portion 29a of the key member 29 rearward or backward more than its arc portion 29b with the engagement portion 222 of the power piston 22 as the supporting point.

Therefore, the further retreating movement of the input member 28 from the first retreat limit position causes the negative-pressure valve seat 22a and the negative-pressure sealing member 36b, which have been separated from each other by the distance A+D, to be made more distant from each other. Because the separation between the negative-pressure valve seat 22a and the negative-pressure sealing member 36b is increased, the atmospheric air in both rear chambers 24, 26 is quickly discharged via the first front chamber 23 because of the existence of the negative-pressure source 100. As the pressure in both rear chambers 24, 26 quickly decreases, the input member 28, both movable walls 17, 20, the power piston 22, and the output rod 53 retreated quickly with respect to the housing 14.

As the input member 28, the movable walls 17, 20, the power piston 22, and the output rod 53 retreat with respect to the housing 14, the rear surface 29e of the arc portion 29b of the key member 29 comes into contact with the rear shell 12 in due course, whereupon the retreat of the input member 28 with respect to the housing 14 is stopped.

On the other hand, the retreating movement of both movable walls 17, 20, the power piston 22, and the output rod 53 with respect to the housing 14 continues until the power piston 22 reaches the retreat limit position with respect to the housing 14, that is the position where the front wall 223 of the radial hole 30 of the power piston 22 contacts the front surface 29c of the plate portion 29a of the key member 29 and the rear surface 29e of the arc portion 29b of the key member 29 contacts the rear shell 12 by way of the damper member 32.

As both movable walls 17, 20 and the power piston 22 return to their initial positions, the transmission force between the power piston 22 and the output rod 53 decreases, whereby the reaction disc 52 returns to the state shown in FIG. 2 by virtue of its own elasticity. As the reaction force that is applied from the reaction disc 52 to the input member 28 decreases, the input member 28 is moved forward because of the restitutive force of the plate portion 29a of the key member 29.

As the plate portion 29a of the key member 29 returns to its initial state and both of the movable walls 17, 20, the power piston 22, and the output rod 53 retreat, the front surface 29c of the plate portion 29a and the front wall 223 of the radial hole 30 of the power piston 22 come into contact with each other and the power piston 22 and hence both movable walls 17, 20 and the output rod 53 return to their initial positions. As a result, the negative-pressure valve seat 22a of the power piston 22 and the negative-pressure sealing portion 36b of the control valve 36 come close to each other to establish a non-operation state in which a small gap exists between the negative-pressure valve seat 22a and the negative-pressure sealing portion 36b.

When the backward bending of the plate portion 29a with respect to the arc portion 29b of the key member 29 increases as the input member 28 further retreats from the first retreat limit position, the rear surface 29d of the plate portion 29a comes into contact with the rear wall 224 of the radial hole 30 of the power piston 22. Once the plate portion 29a contacts the rear wall 224, the plate portion 29a cannot be bent backward any further with respect to the arc portion 29b, and so the retreating movement of the input member 28 is restricted.

That is, the position at which the rear surface 29e of the arc portion 29b of the key member 29 is in contact with the engagement portion 222 of the power piston 22, the rear surface of the front flange portion 33 is in contact with the front surface 29c of the plate portion 29a of the key member 29, and the rear surface 29d of the plate portion 29a is in contact with the rear wall 224 of the radial hole 30 of the power piston 22 defines a second retreat limit position of the input member 28 with respect to the power piston 22.

Because the slider valve 42 is disposed independently of the input member 28, the slider valve 42 does not act on the input member 28 as the input member 28 advances. Further, the spring 43 that urges the slider valve 42 forward does not act on the input member 28 either.

For example, if an intervehicle distance sensor (not shown) has detected during vehicle movement that the distance from the vehicle ahead has become shorter than a predetermined distance, an automatic braking operation is performed in which the electronic control device 50 activates the actuator 45 based on the detection result of the intervehicle distance sensor. That is, the actuator 45 is activated without any manipulation by the driver on the brake pedal 31, the input rod 27, and the input member 28, in other words without any input.

When the electronic control device 50 has energized the solenoid coil 46 with a current i1 based on a detection result of the intervehicle distance sensor, an electromagnetic attractive force acts between the plunger 49 and the yoke 47 so that the plunger 49 retreats with respect to the power piston 22 by a distance S1 (>D+G) against the urging force of the spring 43 that is applied via the slider valve 42. As the plunger 49 retreats, the slider valve 42 also retreats with respect to the power piston 22 by the distance S1.

The retreating movement of the slider valve 42 causes the auxiliary negative-pressure valve seat 42a of the slider valve 42 to contact the negative-pressure sealing portion 36b of the control valve 36 so that the vacuum passage 38 and the air passage 39 are isolated from each other. As a result, the first front chamber 23 and the second rear chamber 26 are isolated from each other. Further, the slider valve 42 moves the movable portion 36c of the control valve 36 backward against the urging force of the valve spring 36e, to thereby separate the air valve seat 28a from the air sealing portion 36a.

At this time, the separation between the air valve seat 28a and the air sealing portion 36a is equal to S1–D–G. In addition, the separation S1–D–G between the air valve seat 28a and the air sealing portion 36a is greater than the distance A.

Therefore, atmospheric air flows into both of the rear chambers 24, 26 via the air passage 39 and the clearance between the air valve seat 28a and the air sealing portion 36a. The pressure in both of the rear chambers 24, 26 thus increases, whereby the movable walls 17, 20, the power piston 22, and the output rod 53 are advanced with respect to the housing 14. As the power piston 22 advances, the slider valve 42 is urged forward by the power piston 22 via the spring 43. As a result, the slider valve 42 is also advanced together with the power piston 22 in a state that the slider valve 42 is retreated with respect to the power piston 22 by the distance S1 from the initial state and the auxiliary negative-pressure valve seat 42a is in contact with the negative-pressure sealing portion 36b.

Because the separation S1–D–G between the air valve seat 28a and the air sealing portion 36a is greater than the distance A between the rear surface 29e of the arc portion 29b of the key member 29 and the engagement portion 222 of the power piston 22, the engagement portion 222 of the power piston 22 comes into contact with the rear surface 29e of the arc portion 29b of the key member 29 when the power piston 22 is advanced with respect to the housing 14, the input member 28, and the key member 29.

When the engagement portion 222 contacts the rear surface 29e of the key member 29 as a result of the advancement, by the distance A, of the power piston 22 with respect to the housing 14, the input member 28, and the key member 29, the air sealing portion 36a of the control valve 36 approaches the air valve seat 28a of the input member 28 in association with the advancement of the power piston 22. However, because the separation S1–D–G between the air valve seat 28a and the air sealing portion 36a is greater than the distance A between the rear surface 29e of the arc portion 29b of the key member 26 and the engagement portion 222 of the power piston 22 as described above, the air valve seat 28a and the air sealing portion 36a remain separated from each other by a distance S1–D–G–A.

Therefore, atmospheric air continues to flow into the second rear chamber 26 and hence the first rear chamber 24. As a result, the pressure difference between both front chambers 23, 25 and both rear chambers 24, 26 increases and hence the movable walls 17, 20 and the power piston 22 are advanced further. Because the front surface 29c of the plate portion 29a of the key member 29 is in contact with the rear surface of the front flange portion 33 of the input member 28, further advancement of the power piston 22 after contact between the engagement portion 222 of the power piston 22 and the rear surface 29e of the arc portion 29b of the key member 29 forces, via the key member 29, the input member 28 to advance together with the power piston 22. The advancement of the input member 28 causes the input rod 27 to also advance.

Because the power piston 22 and the input member 28 advance together, the air valve seat 28a that is formed on the input member 28 and the air sealing portion 36a of the control valve 36 that is advancing together with the power piston 22 keep a non-contact state.

The advancing force of both movable walls 17, 20 and the power piston 22 is transmitted from the power piston 22 to the output rod 53 via the yoke/reaction member accommodating member 48 of the actuator 45, the guide member 51, and the reaction disc 52. Thus, both movable walls 17, 20, the power piston 22, and the output rod 53 start to advance together with respect to the housing 14 and the master cylinder 58 starts to operate.

At this time, the reaction disc 52 enters the inside of the guide member 51 to decrease the gap between the rear surface of the central portion of the reaction disc 52 and the front end surface of the input member 28, and comes into contact with the front end surface of the input member 28, to thereby apply a reaction force corresponding to the output of the output rod 53 to the input member 28. This thus causes the input member 28 to retreat with respect to the power piston 22.

At this time, because the rear surface of the front flange portion 33 of the input member 28 is in contact with the front surface 29c of the plate portion 29a of the key member 29 and the rear surface 29e of the arc portion 29b of the key member 29 is in contact with the engagement portion 222 of the power piston 22, the reaction disc 52 moves the input member 28 backward while elastically deforming the key member 29.

The reaction disc 52 bends the plate portion 29a of the key member 29 backward more than its arc portion 29b with the engagement portion 222 of the power piston 22 as the supporting point, and moves the input member 28 backward. That is, the reaction disc 52 moves the input member 28 backward against the restitutive force of the plate portion 29a of the key member 29.

As the input member 28 retreats while receiving the reaction force from the reaction disc 52, the air sealing portion 36a of the control valve 36 is once again contacted by the air valve seat 28a, whereby the flow of atmospheric air into both rear chambers 24, 26 is stopped. That is, the valve mechanism 35 switches to the output holding operation state.

At this time, the input that is applied from the brake pedal 31 to the input member 28 is zero and the output that is given from the output rod 53 to the master cylinder 58 has a value Fo4 as seen in FIG. 10.

If the current supplied to the solenoid 46 is increased from i1 to i2 in the state in which the valve mechanism 35 assumes the output holding operation state with the output value Fo4, the plunger 49 and hence the slider valve 42 are moved backward with respect to the power piston 22 by a distance S2–S1. As the slider valve 42 retreats, the movable portion 36c of the control valve 36 is moved backward while the auxiliary negative-pressure valve seat 42a of the slider valve 42 and the negative-pressure sealing portion 36b of the control valve 36 are in contact with each other. Thus, the air valve seat 28a is separated from the air sealing portion 36a of the control valve 36.

At this time, the separation between the air valve seat 28a and the air sealing portion 36a is equal to S2–S1. Therefore, atmospheric air flows into both rear chambers 24, 26 and the pressure in both rear chambers 24, 26 increases, whereby both movable walls 17, 20, the power piston 22, and the output rod 53 are advanced with respect to the housing 14.

The advancing force of the movable walls 17, 20 and the power piston 22 is transmitted from the power piston 22 to the output rod 53 via the yoke/reaction member accommodating member 48 of the actuator 45, the guide member 51, and the reaction disc 52, whereby both movable walls 17, 20, the power piston 22, and the output rod 53 start to advance together with respect to the housing 14. The master cylinder 68 thus begins to operate.

At this time, the reaction disc 52 enters the inside of the guide member 51 to decrease the gap between the rear surface of the central portion of the reaction disc 52 and the front end surface of the input member 28, and comes into contact with the front end surface of the input member 28. A reaction force corresponding to an output of the output rod 53 is thus applied to the input member 28 to cause the input member 28 to retreat with respect to the power piston 22.

Here, because the rear surface of the front flange portion 33 of the input member 28 is in contact with the front surface 29c of the plate portion 29a of the key member 29 and the rear surface 29e of the arc portion 29b of the key member 29 is in contact with the engagement portion 222 of the power piston 22, the reaction disc 52 moves the input member 28 backward while further elastically deforming the key member 29.

The reaction disc 52 further bends the plate portion 29a of the key member 29 backward more than its arc portion 29b with the engagement portion 222 of the power piston 22 as the supporting point, and moves the input member 28 backward. That is, the reaction disc 52 moves the input member 28 backward against the urging force of the key member 29.

As the air sealing portion 36a of the control valve 36 is advanced with respect to the air valve seat 28a in association with the advancement of the power piston 22 and the input member 28 is retreating while receiving the reaction force from the reaction disc 52, the air sealing portion 36a of the control valve 36 comes to again contact the air valve seat 28a in due course, whereby the flow of atmospheric air into both rear chambers 24, 26 is stopped. That is, the valve mechanism 35 switches to the output holding operation state.

At this time, the input that is applied from the brake pedal 31 to the input member 28 is zero and the output that is given from the output rod 53 to the master cylinder 58 has a value Fo5 as illustrated in FIG. 10. That is, the output is increased from Fo4 to Fo5 by changing the current that is supplied to the solenoid 46 from i1 to i2 in the state in which the output Fo4 is produced by zero input.

If the current supplied to the solenoid 46 is further increased from i2 to i3 in the state that the valve mechanism 35 assumes the output holding operation state with the output value Fo5, the plunger 49 and hence the slider valve 42 are moved backward with respect to the power piston 22 by a distance S3–S2.

As the slider valve 42 retreats, the movable portion 36c of the control valve 36 is moved backward while the auxiliary negative-pressure valve seat 42a of the slider valve 42 and the negative-pressure sealing portion 36b of the control valve 36 are in contact with each other, whereby the air valve seat 28a is separated from the air sealing portion 36a of the control valve 36.

At this time, the separation between the air valve seat 28a and the air sealing portion 36a is equal to S3–S2. Therefore, atmospheric air flows into both rear chambers 24, 26 and the pressure in both rear chambers 24, 26 increases, whereby both movable walls 17, 20, the power piston 22, and the output rod 53 are advanced with respect to the housing 14.

The advancing force of the movable walls 17, 20 and the power piston 22 is transmitted from the power piston 22 to the output rod 53 via the yoke/reaction member accommodating member 48 of the actuator 45, the guide member 51, and the reaction disc 52. The movable walls 17, 20, the power piston 22, and the output rod 53 thus start to advance together with respect to the housing 14, and the master cylinder 58 starts to operate.

At this time, the reaction disc 52 enters the inside of the guide member 51 to decrease the gap between the rear surface of the central portion of the reaction disc 52 and the front end surface of the input member 28, and comes into contact with the front end surface of the input member 28, to thereby apply a reaction force corresponding to an output of the output rod 53 to the input member 28 to retreat the input member 28 with respect to the power piston 22.

Then, because the rear surface of the front flange portion 33 of the input member 28 is in contact with the front surface 29c of the plate portion 29a of the key member 29 and the rear surface 29e of the arc portion 29b of the key member 29 is in contact with the engagement portion 222 of the power piston 22, the reaction disc 52 moves the input member 28 backward while further elastically deforming the key member 29.

The reaction disc 52 attempts to further bend the plate portion 29a of the key member 29 backward more than its arc portion 29b, with the engagement portion 222 of the power piston 22 as the supporting point, and to move the input member 28 backward. That is, the reaction disc 52 attempts to move the input member 28 backward against the urging force of the key member 29.

However, when the key member 29 has been elastically deformed upon receiving the reaction force from the reaction disc 52 via the input member 28, the rear surface 29d of the plate portion 29a of the key member 29 comes into contact with the rear wall 224 of the radial hole 30 of the power piston 22. Because the rear surface 29d of the plate portion 29a is in contact with the rear wall 224 of the radial hole 30, the plate portion 29a can no longer be bent backward with respect to the arc portion 29b. The input member 28 is thus located at the second retreat limit position with respect to the power piston 22 and the backward movement of the input member 28 is restricted by the key member 29.

Because the backward movement of the input member 28 with respect to the power piston 22 is restricted, the separated state of the air valve seat 28a and the air sealing portion 36a (i.e., the output increasing operation state of the valve mechanism 35) continues and atmospheric air continues to flow into both rear chambers 24, 26. Therefore, both movable walls 17, 20 and the power piston 22 continue to advance and the output rod 53 continues to produce an output until the pressure in both rear chambers 24, 26 reaches atmospheric pressure.

Once the pressure in both rear chambers 24, 26 has reached atmospheric pressure, atmospheric air no longer flows into both rear chambers 24, 26 and so the advancement of the movable walls 17, 20 and the power piston 22, and hence the advancement of the output rod 53 stops.

At this time, the input that is applied from the brake pedal 31 to the input member 28 is zero and the output that is given from the output rod 53 to the master cylinder 58 has a value Fo6 as shown in FIG. 10. That is, the output is increased from Fo5 to F06 by changing the current that is supplied to the solenoid 46 from i2 to i3 in the state that the output Fo5 is produced by the zero input. The output Fo6 that is produced by the negative-pressure booster 10 is the maximum output in the automatic braking operation.

The output of the negative-pressure booster 10 during the automatic braking operation depends on the current that is supplied to the solenoid 46 as well as the restitutive force that is associated with the elastic deformation of the key member 29. That is, the output during the automatic braking operation is increased if the restitutive force of the key member 29 is increased, and the output during the automatic braking operation is decreased if the restitutive force of the key member 29 is decreased. The output value range of the automatic braking operation is Fo1 to Fo6, with the value Fo6 indicating that the pressure in both rear chambers 24, 26 has reached atmospheric pressure.

When the condition for not energizing the solenoid coil 46 has been satisfied, for example when the intervehicle distance sensor has detected that the distance from the vehicle ahead has returned to a predetermined value in a state in which the negative-pressure booster 10 is producing the output Fo6 and the valve mechanism 35 assumes the output holding operation state, the electronic control device 50 de-energizes the solenoid coil 46 based on the detection result of the intervehicle distance sensor.

As a result, the slider valve 42 and the plunger 49 are returned to the positions illustrated in FIG. 2 by the spring 43. As the plunger 49 and the slider valve 42 return to their initial positions, the auxiliary negative-pressure valve seat 42a of the slider valve 42 is separated from the negative-pressure sealing portion 36b, and the first front chamber 23 and the second rear chamber 26 come into communication with each other via the vacuum passage 38, the clearance between the negative-pressure valve seat 22a and the negative-pressure sealing portion 36b, the clearance between the auxiliary negative-pressure valve seat 42a and the negative-pressure sealing portion 36b, and the air passage 39.

Therefore, atmospheric air in both of the rear chambers 24, 26 flows into the negative-pressure source 100 via the first rear chamber 23, and the pressure differential between both front chambers 23, 25 and both rear chambers 24, 26 is decreased. As the pressure differential between both front chambers 23, 25 and both rear chambers 24, 26 decreases, both movable walls 17, 20 and the power piston 22 are urged backward by the return spring 54 and return to their initial positions.

As the power piston 22 retreats, the urging force of the spring 41 causes the key member 29, the input member 28, and the input rod 27 to retreat together with the power piston 22. The power piston 22 and the input member 28 retreat in the state that the valve mechanism 35 assumes the output decreasing operation state. The key member 29 is restored, and the input member 28 and the input rod 27 advance with respect to the power piston 22 in association with the restoration of the key member 29, and the initial state shown in FIG. 2 is finally reestablished.

If the driver, for example, quickly pushes the brake pedal 31 with an input value Fi3 to effect an urgent braking operation, the input member 28 is advanced with respect to the power piston 22 and the state of the valve mechanism 35 switches from the output decreasing operation state to the output increasing operation state via the output holding operation state as described above for the ordinary braking operation. By virtue of atmospheric air flowing into both rear chambers 24, 26, the movable walls 17, 20, the power piston 22, and the output rod 53 start to advance with respect to the housing 14. In due course, the input Fi3 to the input member 28 is balanced with the reaction force from the reaction disc 52, whereby the valve mechanism 35 assumes the output holding operation state and an output Fo3 is produced.

When the valve mechanism 35 is in the output holding operation state, the distance between the rear surface 29e of the arc portion 29b of the key member 29 and the engagement portion 222 of the power piston 22 is equal to A+D. That is, as for the first retreat limit position, the input member 28 can move backward with respect to the power piston 22 by the distance A+D.

If it is detected by a means for detecting the pushing speed of the brake pedal 31 (not shown) that the operation of the brake pedal 31 with the input value Fi3 is a sudden braking manipulation, a sudden braking operation is effected. That is, the electronic control device 50 supplies a current i4 to the solenoid coil 46 in the state that the valve mechanism 35 assumes the output holding operation state.

As a result, an electromagnetic attractive force acts between the plunger 49 and the yoke 47, and the plunger 49 retreats with respect to the power piston 22 by a distance S4. As the plunger 49 retreats, the slider valve 42 also retreats with respect to the power piston 22 by the distance S4.

As the slider valve 42 retreats, the auxiliary negative-pressure valve seat 42a of the slider valve 42 comes into contact with the negative-pressure sealing portion 36b of the control valve 36 so that the first front chamber 23 and the second rear chamber 26 are isolated from each other. Further, the slider valve 42 moves the movable portion 36c of the control valve 36 backward against the urging force of the valve spring 36e to thereby separate the negative-pressure valve seat 22a from the negative-pressure sealing portion 36b and separate the air valve seat 28a from the air sealing portion 36a by a distance S4–G.

By this operation, the negative-pressure sealing portion 36b of the control valve 36 is separated from the negative-pressure valve seat 22a of the power piston 22. However, because the auxiliary negative-pressure valve seat 42a of the slider valve 42 is in contact with the negative-pressure sealing portion 36b, the air valve seat 28a and the air sealing portion 36a of the control valve 36 are separated from each other while both rear chambers 24, 26 and both front chambers 23, 25 are kept isolated from each other.

Therefore, atmospheric air further flows into both of the rear chambers 24, 26 to further increase the pressure in both rear chambers 24, 26, whereby both movable walls 17, 20, the power piston 22, and the output rod 53 are further advanced with respect to the housing 14. As the power piston 22 advances, the slider valve 42 is urged forward by the power piston 22 via the spring 43. As a result, the slider valve 42 is also advanced together with the power piston 22 in the state in which the slider valve 42 has retreated with respect to the power piston 22 by the distance S4 from the initial state and the auxiliary negative-pressure valve seat 42a is in contact with the negative-pressure sealing portion 36b.

As the power piston 22 advances with respect to the input member 28 and the key member 29, the air sealing portion 36a of the control valve 36 approaches the air valve seat 28a and the engagement portion 222 of the power piston 22 approaches the rear surface 29e of the arc portion 29b of the key member 29. Further, the reaction disc 52 enters the inside of the guide member 53, comes into contact with the front end surface of the input member 28, and applies a reaction force to the input member 28. The reaction disc 52 thus attempts to cause the input member 28 to retreat.

At this time, because the distance S4–G is greater than the distance A+D, as the power piston 22 advances with respect to the input member 28 and the key member 29, and the input member 28 retreats by the reaction disc 53, the rear surface 29e of the arc portion 28b of the key member 29 comes into contact with the engagement portion 222 of the power piston 22 before the air valve seat 28a contacts the air sealing portion 36a.

Therefore, the rear surface of the front flange portion 33 of the input member 28 contacts the front surface 29c of the plate portion 29a of the key member 29 and the rear surface 29e of the arc portion 29b of the key member 29 contacts the engagement portion 222 of the power piston 22. Thus, the reaction disc 52 moves the input member 28 backward while elastically deforming the key member 29.

The reaction disc 52 bends the plate portion 29a of the key member 29 backward more than its arc portion 29b with the engagement portion 222 of the power piston 22 as the supporting point, and moves the input member 28 backward. That is, the reaction disc 52 moves the input member 28 backward against the restitutive force of the plate portion 29a of the key member 29.

As a result of the actions that the air sealing portion 36a advances with respect to the air valve seat 28a in association with the advancement of the power piston 22, and the input member 28 retreats upon receiving the reaction force from the reaction disc 52, in due course the air sealing portion 36a of the control valve 36 again contacts the air valve seat 28a, whereby the flow of atmospheric air into both rear chambers 24, 26 is stopped. That is, the valve mechanism 35 switches to the output holding operation state.

The front-rear position of the input member 28 with respect to the power piston 22 in the state that the valve mechanism 35 assumes the output holding operation state is shifted backward by a distance S4–G from the front-rear position in the state that the valve mechanism 35 assumes the output holding operation state with an input value Fi3 in the ordinary braking operation. Therefore, the amount by which the reaction disk 52 enters into the inside of the guide member 53 is greater than in the case of the ordinary braking operation.

At this time, the input that is applied from the brake pedal 31 to the input member 28 has a value Fi3 and the output that is given from the output rod 53 to the master cylinder 58 has a value Fo7 as shown in FIG. 10. In other words, the output Fo7 that is larger than the output Fo3 can be produced by the input Fi3 that corresponds to the output Fo3 in the case of the ordinary braking operation.

If the current supplied to the solenoid 46 is increased from i4 to i5 in the state that the valve mechanism 35 assumes the output holding operation state with the output value Fo7, the slider valve 42 is further moved backward with respect to the power piston 22 by a distance S5–S4. As the slider valve 42 retreats, the movable portion 36c of the control valve 36 is moved backward while the auxiliary negative-pressure valve seat 42a of the slider valve 42 and the negative-pressure sealing portion 36b of the control valve 36 are in contact with each other, whereby the air valve seat 28a is separated from the air sealing portion 36a of the control valve 36.

At this time, the separation between the air valve seat 28a and the air sealing portion 36a is equal to S5–S4. Therefore, atmospheric air flows into both rear chambers 24, 26 and the pressure in both rear chambers 24, 26 increases, whereby both movable walls 17, 20, the power piston 22 and the output rod 53 are advanced with respect to the housing 14.

The advancing force of both movable walls 17, 20 and the power piston 22 is transmitted from the power piston 22 to the output rod 53 via the yoke/reaction member accommodating member 48 of the actuator 45, the guide member 51 and the reaction disc 52 so that the movable walls 17, 20, the power piston 22, and the output rod 53 start to advance together with respect to the housing 14. The master cylinder 58 thus begins to operate.

At this time, the reaction disc 52 enters the inside of the guide member 51 to decrease the gap between the rear surface of the central portion of the reaction disc 52 and the front end surface of the input member 28, and comes into contact with the front end surface of the input member 28, thereby applying a reaction force corresponding to the output of the output rod 53 to the input member 28 to cause the input member 28 to retreat with respect to the power piston 22.

At this time, because the rear surface of the front flange portion 33 of the input member 28 is in contact with the front surface 29c of the plate portion 29a of the key member 29 and the rear surface 29e of the arc portion 29b of the key member 29 is in contact with the engagement portion 222 of the power piston 22, the reaction disc 52 moves the input member 28 backward while further elastically deforming the key member 29.

The reaction disc 52 further bends the plate portion 29a of the key member 29 backward more than its arc portion 29b with the engagement portion 222 of the power piston 22 serving as the supporting point, and moves the input member 28 backward. That is, the reaction disc 52 moves the input member 28 backward against the urging force of the key member 29.

As the air sealing portion 36a of the control valve 36 is advanced with respect to the air valve seat 28a in association with the advancement of the power piston 22, and the input member 28 is retreated upon receiving the reaction force from the reaction disc 52, the air sealing portion 36a of the control valve 36 comes into contact once again with the air valve seat 28a, whereby the flow of atmospheric air into both rear chambers 24 and 26 stops. That is, the valve mechanism 35 switches to the output holding operation state.

At this time, the input that is applied from the brake pedal 31 to the input member 28 have a value Fi3 and the output that is given from the output rod 53 to the master cylinder 58 has a value Fo8 as shown in FIG. 10. That is, the output is increased from Fo7 to Fo8 by changing the current that is supplied to the solenoid 46 from i4 to i5 in the state that the output Fo7 is produced by the input Fi3. In other words, the output Fo8 that is larger than an output Fo3 can be produced by the input Fi3 that corresponds to the output Fo3 in the case of the ordinary braking operation.

If the current supplied to the solenoid 46 is further increased from i5 to i6 in the state that the valve mechanism 35 is in the output holding operation state with the output value Fo8, the plunger 49 and hence the slider valve 42 are further moved backward with respect to the power piston 22 by a distance S6–S5. As the slider valve 42 retreats, the movable portion 36c of the control valve 36 is moved backward while the auxiliary negative-pressure valve seat 42a of the slider valve 42 and the negative-pressure sealing portion 36b of the control valve 36 are in contact with each other, whereby the air valve seat 28a is separated from the air sealing portion 36a of the control valve 36.

At this time, the separation between the air valve seat 28a and the air sealing portion 36a is equal to S6–S5. Therefore, atmospheric air flows into the rear chambers 24, 26 and the pressure in both rear chambers 24, 26 increases. The movable walls 17, 20, the power piston 22, and the output rod 53 are thus advanced with respect to the housing 14.

The advancing force of both movable walls 17, 20 and the power piston 22 is transmitted from the power piston 22 to the output rod 53 via the yoke/reaction member accommodating member 48 of the actuator 45, the guide member 51, and the reaction disc 52. Thus, the movable walls 17, 20, the power piston 22, and the output rod 53 start to advance together with respect to the housing 14, and the master cylinder 58 begins to operate.

At this time, the reaction disc 52 enters the inside of the guide member 51 to decrease the gap between the rear surface of the central portion of the reaction disc 52 and the front end surface of the input member 28, and comes into contact with the front end surface of the input member 28. A reaction force corresponding to the output of the output rod 53 is thus applied to the input member 28 to retreat the input member 28 with respect to the power piston 22.

At this time, because the rear surface of the front flange portion 33 of the input member 28 is in contact with the front surface 29c of the plate portion 29a of the key member 29, and the rear surface 29e of the arc portion 29b of the key member 29 is in contact with the engagement portion 222 of the power piston 22, the reaction disc 52 moves the input member 28 backward while further elastically deforming the key member 29.

The reaction disc 52 attempts to further bend the plate portion 29a of the key member 29 backward more than its arc portion 29b with the engagement portion 222 of the power piston 22 serving as the supporting point, and to move the input member 28 backward. That is, the reaction disc 52 attempts to move the input member 28 backward against the urging force of the key member 29.

However, when the key member 29 has been deformed elastically upon receiving the reaction force from the reaction disc 52 via the input member 28, the rear surface 29d of the plate portion 29a of the key member 29 comes into contact with the rear wall 224 of the radial hole 30 of the power piston 22. Because the rear surface 29d of the plate portion 29a is in contact with the rear wall 224 of the radial hole 30, the plate portion 29a can no longer be bent backward with respect to the arc portion 29b. Therefore, the backward movement of the input member 28 is restricted by the key member 29.

Because the backward movement of the input member 28 with respect to the power piston 22 is restricted, the separated state of the air valve seat 28a and the air sealing portion 36a, that is the output increasing operation state of the valve mechanism 35, continues and atmospheric air continues to flow into both of the rear chambers 24, 26. Therefore, both movable walls 17, 20 and the power piston 22 continue to advance and the output rod 53 continues to produce an output until the pressure in both rear chambers 24, 26 reaches atmospheric pressure.

Once the pressure in both rear chambers 24, 26 has reached atmospheric pressure, atmospheric air no longer flows into the rear chambers 24, 26 and so the advancing movement of the movable walls 17, 20 and the power piston 22, and hence the advancement of the output rod 53, stops.

At this time, the input that is applied from the brake pedal 31 to the input member 28 has a value Fi3 and the output that is applied from the output rod 53 to the master cylinder 58 has a value Fo9 as shown in FIG. 10. That is, the output is increased from Fo8 to Fo9 by changing the current that is supplied to the solenoid 46 from i5 to i6 in the state that the output Fo8 is produced by the input Fi3. In other words, the output Fo9 that is larger than the output Fo3 can be produced by the input Fi3 that corresponds to the output Fo3 in the case of the ordinary braking operation. The output Fo9 that is produced by the negative-pressure booster 10 is the maximum output of the sudden braking operation with the input Fi3.

If, for example, a braking operation has become no longer necessary and the driver stops pushing the brake pedal 31 in a state that the solenoid 46 is supplied with a current i6, the negative-pressure booster 10 is producing an output Fo9 and the valve mechanism 35 assumes the output holding operation state, the input rod 27 and hence the input member 28 retreat with respect to the power piston 22 by the reaction force applied from the reaction disc 52 and the urging force of the spring 41 approximately in the same manner as when the pushing of the brake pedal 31 is canceled during an ordinary braking operation.

As a result of the retreating movement of the input member 28, the auxiliary negative-pressure valve seat 42a of the slider valve 42 is separated from the negative-pressure sealing portion 36b of the control valve 36 and the valve mechanism 35 switches to the output decreasing operation state. Further, the pressure in both rear chambers 24, 26 decreases and the output is thereby reduced.

As a result, the input member 28, both movable walls 17, 20, the power piston 22 and the output rod 53 retreat with respect to the housing 14. Finally, the non-operation state shown in FIGS. 1–3 is reached.

When the condition for no longer energizing the solenoid coil 46 has been satisfied, the electronic control device 50 de-energizes the solenoid coil 46, whereby the slider valve 42 and the plunger 49 are returned to their original positions shown in FIG. 2 by the urging force of the coil spring 43.

It is possible for the electronic control device 50 to control the actuator 45 based on a detection result of the fluid pressure sensor 51 shown in FIG. 1 so that the fluid pressure of the master cylinder 58 and hence the output of the negative-pressure booster 10 to the master cylinder 58 have desired values.

As described above, in accordance with the negative-pressure booster 10 of the present invention, the attractive force generated by the solenoid 46 of the actuator 45, that is the driving force of the actuator 45, can be adjusted by adjusting the current that is supplied to the solenoid 46 of the actuator 45. By making the driving force of the actuator 45 adjustable, the front-rear movement distance of the slider valve 42 and hence the output that is exerted by the output rod 53 in association with the operation of the actuator 45 can be adjusted. This makes it possible to produce an output that is more suitable for each situation.

Unlike other known boosters, a detecting device for detecting the separation between the air valve seat and the air sealing portion is not needed. Therefore, the construction of the booster can be simplified and the cost can be reduced. That is, the present invention provides a negative-pressure booster 10 that is simpler in construction and lower in cost.

In general, negative-pressure boosters that are adapted to be positioned in a relatively narrow space such as an engine room must be small in order to efficiently utilize the installation space and improve the ease of assembly. However, in other known negative-pressure boosters such as that disclosed in Japanese Patent Laid-open Publication No. 7-251733, for example, an urging member is provided inside an actuator, which may increase the size of the actuator and hence the size of the negative-pressure booster itself. In particular, in an actuator that has a solenoid and a plunger, and wherein an urging member is provided on the inner side of the plunger, the size of the actuator is more likely to be increased because the number of turns of the solenoid needs to be increased with an increase in the plunger diameter.

In contrast, the negative-pressure booster 10 of the present invention is not susceptible to the possibility that the sizes of the plunger 49 and the solenoid 46 are increased and hence is not susceptible to the possibility that the sizes of the actuator 45 and the negative-pressure booster 10 itself are increased because the spring 43 is disposed between the slider valve 42 and the power piston 22 (i.e., outside the actuator 45). Therefore, the present invention provides a negative-pressure booster 10 that is smaller in size.

Further, because the spring 43 is disposed in the air passage 39, the space in the power piston 22 can be utilized efficiently, which once again contributes to reducing the size of the power piston 22.

In some known negative-pressure boosters, such as that described in Japanese Publication No. 7-251733, the flow of atmospheric air into the rear chambers that is caused by activating the actuator continues until the pressure in the rear chambers reaches atmospheric pressure. In this type of negative-pressure booster, the output of the negative-pressure booster that is output from an output member in association with the operation of the actuator is at a maximum.

It is conceivable that this type of negative-pressure booster that produces an output with the operation of the actuator that is separate from a manipulation on an input member may be used in an automatic braking apparatus for keeping the intervehicle distance at a predetermined distance. As described above, the automatic braking apparatus is designed to maintain the distance from the vehicle ahead at a predetermined distance so that when the distance from the vehicle ahead has become shorter than a predetermined distance during running of the vehicle, the automatic braking apparatus is activated to effect braking without brake pedal manipulation by the driver (i.e., the braking is effected by the vehicle). There is a tendency that the automatic braking operation performed by such an automatic braking apparatus need not be a relatively strong braking force.

If the known negative-pressure booster as mentioned above is applied to an automatic braking apparatus, the actuator is activated when the intervehicle distance has become shorter than the predetermined distance and the negative-pressure booster provides an output without a braking manipulation by the driver, that is without a manipulation on the input member, whereby an automatic braking operation is performed. However, the braking force that is generated at this time is based on the maximum output produced by the negative-pressure booster and hence is very strong. Such strong braking force is not best for the automatic braking operation in the automatic braking apparatus. That is, in the braking apparatus that does not require the maximum output of the negative-pressure booster, known negative-pressure boosters such as that disclosed in Japanese Publication No. 7-251733 may not provides the best result.

In contrast, in the negative-pressure booster of the present invention, during operation of the actuator 45 when manipulation of the brake pedal 31 is not being performed and operation of the he input member 28 is not occurring, in other words during an automatic braking operation, the advancement of the power piston 22 with respect to the input member 28 and the retreat of the input member 28 with respect to the power piston 22 that is caused by the reaction disc 52 causes the valve mechanism 35 to assume the output holding operation state, thus making it possible to prevent the pressure in both rear chambers 24, 26 from reaching atmospheric pressure. Further, the key member 29 inhibits the retreat of the input member 28 with respect to the power piston 22 that is caused by the reaction disc 52, whereby the restitution force of the key member 29 is set properly. In this manner, the output during the automatic braking operation can be easily set. Therefore, by virtue of the present invention, a negative-pressure booster is provided in which the output that is produced in association with the operation of the actuator can be restricted to be smaller than the maximum output.

Further, the engagement member that is deformed elastically and thereby allows retreat of the input member 28 when the reaction disc 52 retreats the input member 28 in association with the operation of the actuator 45 is the key member 29. This allows the negative-pressure booster 10 to have a simple construction.

When the input to the brake pedal 31 and hence the input member 28 are decreased quickly during an ordinary braking operation, the output of the negative-pressure booster 10 can be decreased faster and hence the recovering operation can be effected faster.

By properly adjusting the current that is supplied to the solenoid 46, the input/output characteristics of the negative-pressure booster 10 that are obtained in association with the operation of the actuator 45 can be tailored to the desired needs.

The urging member that urges the input member 28 when the reaction disc 52 causes the input member 28 to retreat in association with the operation of the actuator 45 is the key member 29. This once again contributes to a more simple construction of the negative-pressure booster 10.

By properly setting the urging force of the key member 29, it is possible to set the movement distance of the slider valve 42 and hence the plunger 49, to thereby reduce the movement distance of the slider valve 42 and the plunger 49. This also allows the negative-pressure booster 10 to be reduced in size.

Although in the embodiment of the present invention described above, the spring 43 has a general shape that is obtained by curving a flat plate, the invention is not limited to such a construction of the spring and a spring of any shape may be used as long as it can urge the slider valve 42 forward.

Also while the described embodiment envisions positioning the spring 43 in the air passage 30, the invention is not limited to such a construction. For example, a negative-pressure booster according to the invention in which the spring 43 is disposed in a radial hole can still provide the same effects and advantages.

The key member 29 is described as being composed of the plate portion 29a and the arc portion 29b, the invention is not limited in this regard and the key member 29 may have any shape as long as it can urge the input member 28 forward when the input member 28 is retreated by the reaction disc 52 in association with the operation of the actuator 45.

The negative-pressure booster described above possesses a tandem configuration, but it is to be understood that the negative-pressure booster having a single configuration can still provide the advantageous effects and advantages as described above.

In the embodiment described above, the sudden braking operation is described in such a manner that the actuator 45 is activated after the valve mechanism 35 has assumed the output holding operation state. However, the present invention is not limited in this regard. For example, a negative-pressure booster according to the invention in which the actuator 45 is activated approximately at the same time as the pushing manipulation on the brake pedal 31 can still provide similar effects and advantages as those described above. Also while the negative-pressure booster is described as being applied to braking apparatus for intervehicle distance control and sudden braking assistance, the invention is not limited to those cases. A negative-pressure booster according to the invention can still provide similar advantages as those described above even when applied to any other braking apparatus that does not require the negative-pressure booster to produce the maximum output.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A negative-pressure booster comprising:

a housing in which is formed at least one pressure space;

a movable wall provided in the housing so as to be able to advance and retreat with respect to the housing, said movable wall dividing the pressure space into a front chamber adapted to communicate with a negative-pressure source and a rear chamber adapted to be selectively communicated with the front chamber or atmosphere;

a power piston connected to the movable wall;

an input member provided inside the power piston and able to advance and retreat with respect to the power piston;

a valve mechanism for allowing the rear chamber to communicate with the front chamber or atmosphere according to movement of the input member;

an output member for outputting outside the booster advancing force of the power piston that is generated in association with movement of the movable wall;

a reaction force member for transmitting to the output member an advancing force of the power piston and an input applied to the input member, and for applying a reaction force corresponding in magnitude to an output of the output member to the input member to cause the input member to retreat so that the valve mechanism interrupts communication between the rear chamber and atmosphere;

an operating member movable relative to the input member for operatively engaging the valve mechanism to allow communication of the rear chamber with atmosphere while interrupting communication between the front and rear chambers;

an actuator connected to the power piston, said actuator being operatively associated with the operating member to move the operating member upon actuation of the actuator for allowing the rear chamber to communicate with atmosphere while interrupting communication between the front and rear chambers, an adjustment of a driving force of the actuator producing an adjustable output of the output member; and an engagement member adapted to engage the input member to allow the input member to retreat by being elastically deformed when the input member receives the reaction force from the reaction force member in association with operation of the actuator, the retreat of the input member receiving the reaction force from the reaction force member in association with operation of the actuator causing the valve mechanism to operate to thereby isolate the rear chamber from atmosphere.

2. The negative-pressure booster according to claim 1, wherein the valve mechanism includes an air valve seat that is adapted to advance and retreat together with the input member, a negative-pressure valve seat provided in the power piston, an air sealing portion for contacting and being separated from the air valve seat to isolate the rear chamber from atmosphere when the air sealing portion contacts the air valve seat and to communicate the rear chamber with atmosphere when the air sealing portion is separated from the air valve seat, and a negative-pressure sealing portion for contacting and being separated from the negative-pressure valve seat to isolate the rear chamber from the front chamber when the negative pressure sealing portion comes into contact with the negative-pressure valve seat and to communicate the rear chamber with the front chamber when the negative pressure sealing portion is separated from the negative-pressure valve seat, the actuator allowing the rear chamber to communicate with atmosphere by separating the air sealing portion from the air valve seat, and the retreat of the input member upon receiving the reaction force from the reaction force member in association with operation of the actuator causing the air sealing portion to come into contact with the air valve seat to thereby allow the rear chamber to be isolated from atmosphere.

3. The negative-pressure booster according to claim 2, wherein the air valve seat is provided in the input member and advances and retreats together with the input member, the air sealing portion and the negative-pressure sealing portion being integrally formed as a control valve, the operating member including a valve seat member that is adapted to advance and retreat with respect to the power piston, said valve seat member being adapted to advance and retreat independently of movement of the input member, and isolating the rear chamber from the front chamber by coming into contact with the negative sealing portion of the control valve, and said actuator allowing the rear chamber to communicate with atmosphere by bringing the valve seat member into contact with the negative-pressure sealing portion by causing the valve seat member to retreat and by separating the air sealing portion from the air valve seat by causing the negative-pressure sealing portion to retreat.

4. The negative-pressure booster according to claim 3, wherein a retreat distance of the valve seat member with respect to the power piston is adjusted by the adjustment of the driving force of the actuator.

5. The negative-pressure booster according to claim 3, wherein the actuator has a solenoid that is connected to a electric power source to cause the valve seat member to retreat by attracting the valve seat member with an attractive force when supplied with electric power, the output of the output member being adjustable in accordance with the attractive force of the solenoid.

6. The negative-pressure booster according to claim 5, wherein a retreating movement distance of the valve seat member is adjusted in accordance with the attractive force of the solenoid.

7. The negative-pressure booster according to claim 1, wherein the engagement member is engaged with the input member in association with advancing movement of the power piston with respect to the input member that is caused by operation of the actuator to thereby allow the input member to move together with the power piston.

8. The negative-pressure booster according to claim 1, wherein the engagement member is engaged with the input member as the power piston advances with respect to the input member as a result of operation of the actuator during a non-manipulation state of the input member, and wherein retreat of the input member, against a restitutive force associated with elastic deformation of the engagement member, upon receiving the reaction force from the reaction force member in association with operation of the actuator during the non-manipulation state of the input member causes the air sealing portion to come into contact with the air valve seat to thereby isolate the rear chamber from atmosphere.

9. The negative-pressure booster according to claim 1, wherein the engagement member is an elastic key member that is engaged with the power piston for retreating and advancing movement with respect to the power piston by a first predetermined distance and that is engaged with the input member for advancing and retreating movement with respect to the input member by a second predetermined distance, the housing having a first opposed portion that is opposed to and adapted to contact a rear surface of the key member, the power piston having a second opposed portion that is opposed to and adapted top contact a front surface of the key member and a third opposed portion that is opposed to and adapted to contact the rear surface of the key member, the input member having a fourth opposed portion that is opposed to and adapted to contact the front surface of the key member and a fifth opposed portion that is opposed to and adapted to contact the rear surface of the key member.

10. The negative-pressure booster according to claim 1, including an urging member provided outside the actuator for inhibiting separation of the air valve seat and the air sealing portion from each other caused by the actuator.

11. The negative-pressure booster according to claim 3, including an urging member provided between the valve seat member and the power piston for urging the valve seat member in an advancing direction.

12. The negative-pressure booster according to claim 11, wherein the urging member is provided outside the actuator.

13. The negative-pressure booster according to claim 11, wherein the power piston has a hole extending in a radial direction of the power piston, said urging member being provided in the hole.

14. A negative-pressure booster for a vehicle having a brake pedal, comprising:
   a housing in which is formed at least one pressure space;
   a movable wall provided in the housing for advancing and retreating movement with respect to the housing, said movable wall dividing the pressure space into a front chamber adapted to communicate with a negative-pressure source and a rear chamber adapted to be selectively communicated with the front chamber or atmosphere;
   a power piston connected to the movable wall;
   an input member provided inside the power piston and able to advance and retreat with respect to the power piston;
   a valve mechanism for allowing the rear chamber to communicate with the front chamber or with atmosphere according to movement of the input member;
   an output member for outputting outside the booster an advancing force of the power piston that is generated in association with movement of the movable wall;
   a reaction force member for transmitting to the output member an advancing force of the power piston and an input applied to the input member, and for applying a reaction force corresponding in magnitude to an output of the output member to the input member to cause the input member to retreat;
   a movable slider valve for operatively engaging the valve mechanism to allow communication of the rear chamber with atmosphere while interrupting communication between the front and rear chambers;
   an actuator operatively associated with the slider valve for moving the slider valve in the absence of an input applied to the brake pedal to effect communication between the rear chamber and the atmosphere while interrupting communication between the front and rear chambers; and
   an elastically deformable engagement member adapted to be engaged by and elastically deformed by the input member when the input member receives the reaction force from the reaction force member in association with operation of the actuator.

15. The negative-pressure booster according to claim 14, wherein the valve mechanism includes an air valve seat that is adapted to advance and retreat together with the input member, a negative-pressure valve seat provided in the power piston, an air sealing portion for contacting and being separated from the air valve seat to isolate the rear chamber from the atmosphere when the air sealing portion contacts the air valve seat and to communicate the rear chamber with atmosphere when the air sealing portion is separated from the air valve seat, and a negative-pressure sealing portion for contacting and being separated from the negative-pressure valve seat to isolate the rear chamber from the front chamber when the negative pressure sealing portion comes into contact with the negative-pressure valve seat and to communicate the rear chamber with the front chamber when the negative pressure sealing portion is separated from the negative-pressure valve seat.

16. The negative-pressure booster according to claim 15, wherein the air valve seat is provided in the input member and advances and retreats together with the input member, the air sealing portion and the negative-pressure sealing portion being integrally formed as a control valve, the slider valve including a valve seat member that is adapted to advance and retreat with respect to the power piston, said valve seat member being adapted to advance and retreat independently of movement of the input member, and isolating the rear chamber from the front chamber by coming into contact with the negative sealing portion of the control valve, and said actuator allowing the rear chamber to communicate with atmosphere by bringing the valve seat member into contact with the negative-pressure sealing portion by causing the valve seat member to retreat and by separating the air sealing portion from the air valve seat by causing the negative-pressure sealing portion to retreat.

17. The negative-pressure booster according to claim 14, wherein the engagement member is an elastic key member that is engaged with the power piston for retreating and advancing movement with respect to the power piston by a first predetermined distance and that is engaged with the input member for advancing and retreating movement with respect to the input member by a second predetermined distance.

18. A negative-pressure booster for a vehicle having a brake pedal, comprising:
   a housing in which is formed at least one pressure space;
   a movable wall provided in the housing so as to be able to advance and retreat with respect to the housing, said movable wall dividing the pressure space into a front chamber adapted to communicate with a negative-pressure source and a rear chamber adapted to be selectively communicated with the front chamber or atmosphere;
   a power piston connected to the movable wall;

an input member provided inside the power piston and able to advance and retreat with respect to the power piston;

a valve mechanism for allowing the rear chamber to communicate with the front chamber or atmosphere according to movement of the input member, the valve mechanism including an air valve seat that is adapted to advance and retreat together with the input member and an air sealing portion for contacting and being separated from the air valve seat to isolate the rear chamber from the atmosphere when the air sealing portion contacts the air valve seat and to communicate the rear chamber with the atmosphere when the air sealing portion is separated from the air valve seat, the booster being devoid of a sensor detecting separation between the air sealing portion and the air valve seat;

an output member for outputting outside the booster an advancing force of the power piston that is generated in association with movement of the movable wall;

a reaction force member for transmitting to the output member an advancing force of the power piston and an input applied to the input member, and for applying a reaction force corresponding in magnitude to an output of the output member to the input member to cause the input member to retreat;

an operating member movable relative to the input member for operatively engaging the valve mechanism to allow communication of the rear chamber with atmosphere while interrupting communication between the front and rear chambers;

an actuator fixed to the power piston and operatively associated with the operating member to move the operating member in the absence of an input applied to the brake pedal to effect communication between the rear chamber and atmosphere while interrupting communication between the front and rear chambers; and an elastically deformable engagement member adapted to engage the input member to cause the input member to retreat by being elastically deformed when the input member receives reaction force from the reaction force member in association with operation of the actuator, the retreat of the input member receiving the reaction force from the reaction force member in association with operation of the actuator causing the valve mechanism to operate to thereby isolate the rear chamber from atmosphere.

19. The negative-pressure booster according to claim 18, wherein the engagement member is an elastic key member that is engaged with the power piston for retreating and advancing movement with respect to the power piston by a first predetermined distance and that is engaged with the input member for advancing and retreating movement with respect to the input member by a second predetermined distance.

\* \* \* \* \*